(12) United States Patent  
Fujinawa

(10) Patent No.: US 6,812,664 B2  
(45) Date of Patent: Nov. 2, 2004

(54) AUTOMATIC LATHE, AND METHOD FOR CONTROLLING THE SAME AND DEVICE FOR CONTROLLING THE SAME

(75) Inventor: Tadashi Fujinawa, Sakado (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/470,421

(22) PCT Filed: Apr. 27, 2001

(86) PCT No.: PCT/JP01/03749

§ 371 (c)(1),  
(2), (4) Date: Jul. 29, 2003

(87) PCT Pub. No.: WO02/091090

PCT Pub. Date: Nov. 14, 2002

(65) Prior Publication Data

US 2004/0056626 A1 Mar. 25, 2004

(51) Int. Cl.⁷ .............................................. G05B 11/01
(52) U.S. Cl. .................... 318/560; 318/567; 318/568.1; 318/570; 318/569; 318/600; 700/159; 700/192; 700/193; 82/19; 82/118; 82/157; 82/158
(58) Field of Search .............................. 318/568.1, 560, 318/567, 569, 600, 570, 578; 700/159, 160, 169, 182, 186, 192, 193; 82/19, 118, 157, 158

(56) References Cited

U.S. PATENT DOCUMENTS

| | | | | |
|---|---|---|---|---|
| 4,413,539 A | * | 11/1983 | Ishizuka et al. | 82/120 |
| 4,584,915 A | * | 4/1986 | Ichiyanagi et al. | 82/19 |
| 4,646,596 A | * | 3/1987 | Edwards et al. | 82/19 |
| 5,127,140 A | * | 7/1992 | Oiwa et al. | 29/27 C |
| 5,243,534 A | * | 9/1993 | Takahashi | 700/179 |
| 5,436,845 A | * | 7/1995 | Takahashi | 700/179 |
| 5,704,262 A | * | 1/1998 | Baumbusch et al. | 82/124 |
| 5,770,936 A | * | 6/1998 | Hirai et al. | 318/538 |
| 6,010,440 A | * | 1/2000 | Miyano | 483/1 |

FOREIGN PATENT DOCUMENTS

| | | |
|---|---|---|
| JP | 11-110047 | 4/1999 |
| JP | 11-259135 | 9/1999 |

\* cited by examiner

*Primary Examiner*—Rina Duda  
(74) *Attorney, Agent, or Firm*—Finnegan, Henderson, Farabow, Garrett & Dunner, L.L.P.

(57) ABSTRACT

A method for controlling an automatically operated lathe, provided with at least one spindle and at least one tool rest, includes the following steps. First, each of a plurality of transfer position data required in a sequence of machining programs in connection with at least one spindle and at least one tool rest is provided in a form of a cam-reference data directing a transfer position as a function of a cam rotation quantity. A plurality of pulse-train generating sources, each of which generates any pulse train, is also provided. Next, with regard to each of the plural transfer position data, a pulse-train generating source for generating a pulse train defining the cam rotation quantity as one component of the cam-reference data is designated, with the pulse-train generating source being selected from the plural pulse-train generating sources. Then, each of the plural transfer position data provided in the form of the cam-reference data is processed by using the pulse train generated through the pulse-train generating source as designated, so as to control a relative feed motion between at least one spindle and at least one tool rest in the sequence of machining programs.

23 Claims, 15 Drawing Sheets

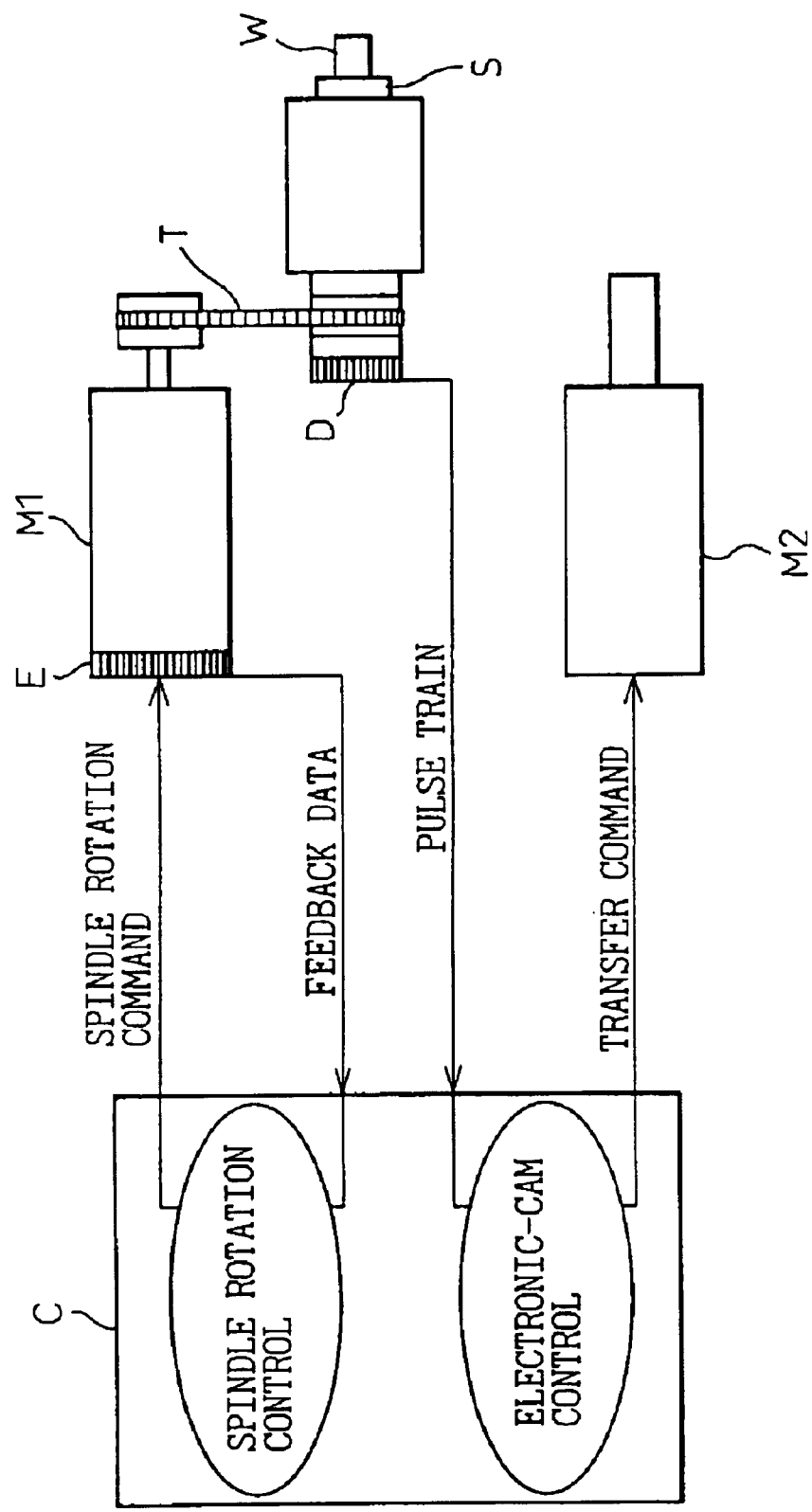

Fig.14
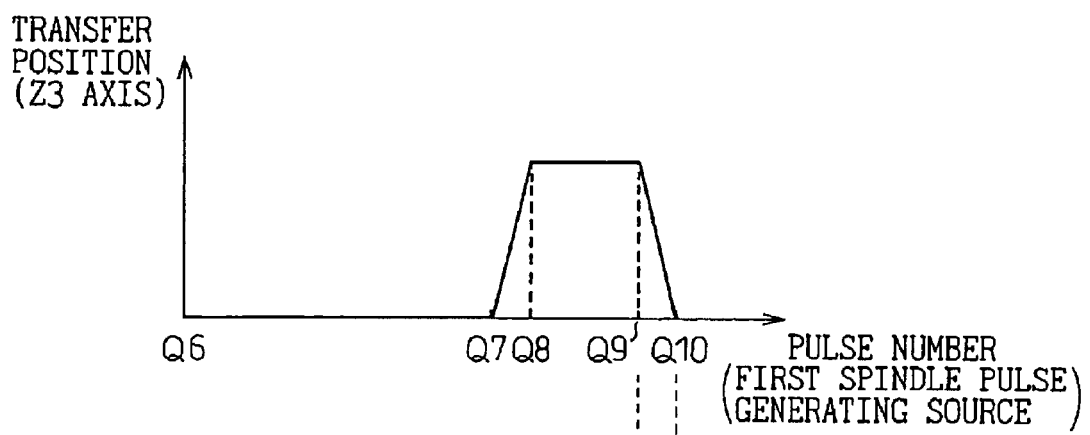
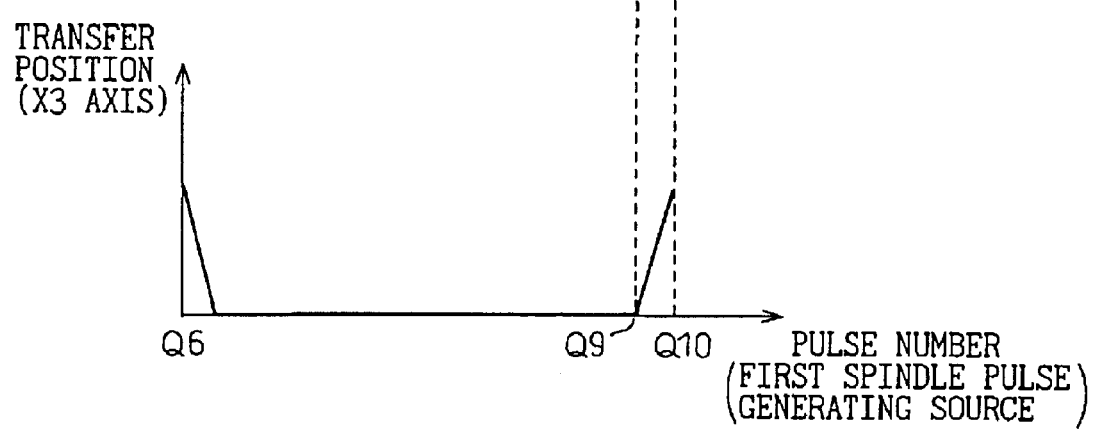

AUTOMATIC LATHE, AND METHOD FOR CONTROLLING THE SAME AND DEVICE FOR CONTROLLING THE SAME

TECHNICAL FIELD

The present invention relates to an automatically operated lathe and method for controlling the same.

BACKGROUND ART

A turning machine tool capable of performing an automatic turning process (referred generically to as an automatically operated lathe in this specification) may automatically carry out various turning processes in sequence or, if necessary, simultaneously, by causing a feed motion of various tools carried on a tool rest relative to a bar-shaped or disk-shaped workpiece to be machined, which is securely held in a spindle. Recently, an automatically operated lathe of a type (called an electronic-cam type) controlling a relative feed motion between a workpiece or spindle and a tool or tool rest by a machining command using a cam-reference data for successively directing tool positions as a function of cam rotation angles, has been provided.

In the electronic-cam type automatically operated lathe, an electric operating command following a predetermined cam curve is used, in place of a mechanical operation of a cam used in a traditional cam-installed automatic lathe, to automatically control a relative feed motion between the spindle and the tool rest. Accordingly, the electronic-cam type automatically operated lathe is capable of advantageously performing a relatively simple machining sequence in a short time, due to respective motions of tools carried on plural tool rests, which follow individual cam curves in a way similar to the conventional cam-installed automatic lathe. In particular, according to such an electronic-cam system, it is not necessary to provide many types of mechanical cams corresponding to the configurations of machined products, and it is possible to significantly reduce time and labor required for an initial set-up, which permits various kinds of products to be manufactured in very high productivity in comparison with the conventional cam-installed automatic lathe.

Also, in the electronic-cam type automatically operated lathe, even when the machine structure thereof is provided with a plurality of control axes along which the spindle and the tool rest are relatively operated, it is possible to prepare cam diagrams for the respective control axes on a common reference (i.e., a cam rotation angle), which advantageously makes it easier to program a synchronizing command of the control axes. Moreover, the operation of the control axes is individually and freely controllable, so that, in the case where various machining processes are successively performed by using plural tools, it is made easier to operate the tools so as to overlap in time, and thereby, it is possible to significantly reduce the time required for the entire machining process (i.e., one machining cycle) of the workpiece to be machined. Contrary to this, in the conventional NC lathe, it is generally difficult, from a viewpoint of machine and control structure, to perform a machining process of one tool until another tool reaches a stand-by position after finishing the machining process thereof, and thereby, the time required for one machining cycle inevitably includes the idle time of tools.

In the above-described electronic-cam type automatically operated lathe, the cam rotation angle as a reference for preparing the cam diagrams may be defined on the basis of a rotational frequency of the spindle. That is, a predetermined rotational frequency of the spindle is defined to correspond to a single rotation (360 degrees) of the cam, and tool positions are successively directed corresponding to the rotational frequencies of the spindle, so as to control the operation of the respective control axes. According to this structure, it is possible to individually control the operation of the plural control axes on the basis of a common reference defined by the rotational frequency of the spindle (normally, the rotational frequency of the drive source of the spindle) that is a mechanically operative component of the automatically operated lathe.

However, in this structure, the operation of the control axes cannot be controlled during a period when the spindle does not rotate. Therefore, it is difficult, in the automatically operated lathe performing an electronic-cam control on the basis of the rotational frequency of the spindle, to carry out, for example, a secondary process (e.g., a cutting process by a rotary tool) during a period when the spindle does not rotate, which can be carried out by a conventional multi-functional numerically-controlled (NC) lathe.

Also, the rotational frequency of the spindle may be varied, in general, due to a machining load applied to the spindle by, e.g., a cutting force during the machining process. In particular, in the structure wherein a drive force from a spindle drive source is transmitted to the spindle through a transmission mechanism such as a belt/pulley, the rotational frequency of the spindle drive source tends to become different from the actual rotational frequency of the spindle, when a slip is caused in the transmission mechanism by the machining load. In this case, in an electronic-cam control on the basis of the rotational frequency of the spindle drive source, the spindle and the tool rest are operated to perform the relative feed motion in accordance with the rotational frequency of the spindle drive source irrespective of the actual machining progress of the workpiece, which may cause deterioration of the machining accuracy.

DISCLOSURE OF THE INVENTION

An object of the present invention is to provide an automatically operated lathe capable of controlling a relative feed motion between a spindle and a tool rest in an electronic-cam system, and capable of exerting multifunctional properties for performing a secondary process during a period when a spindle does not rotate, as well as to provide a method for controlling such an automatically operated lathe.

Another object of the present invention is to provide an automatically operated lathe capable of controlling a relative feed motion between a spindle and a tool rest in an electronic-cam system, and capable of performing a high precision machining without being influenced from the variation of the rotational frequency of the spindle, as well as to provide a method for controlling such an automatically operated lathe.

To achieve the above object, the present invention provides in one aspect thereof a method for controlling an automatically operated lathe provided with at least one spindle and at least one tool rest, comprising providing each of a plurality of transfer position data required in a sequence of machining programs in connection with the at least one spindle and the at least one tool rest in a form of a cam-reference data directing a transfer position as a function of a cam rotation quantity; providing a plurality of pulse-train generating sources, each of which generates any pulse train; designating, with regard to each of the plurality of transfer position data, a pulse-train generating source for generating a pulse train defining the cam rotation quantity as one component of the cam-reference data, the pulse-train generating source being selected from the plurality of pulse-train generating sources; and processing each of the plurality of transfer position data provided in the form of the cam-reference data by using the pulse train generated through the pulse-train generating source as designated, to control a relative feed motion between the at least one spindle and the at least one tool rest in the sequence of machining programs.

In the preferred embodiment, the method for controlling is provided, wherein the at least one spindle and the at least one tool rest are capable of performing a relative feed motion along a plurality of control axes, and wherein the step of designating the pulse-train generating source includes designating the pulse-train generating source with regard to each of the plurality of transfer position data in relation to each of the plurality of control axes.

In the preferred embodiment, the method for controlling is provided, further comprising a step of designating a time-series allocation of the plurality of transfer position data in the sequence of machining programs, wherein the step of processing the transfer position data includes processing, in accordance with the time-series allocation as designated, each of the plurality of transfer position data provided in the form of the cam-reference data.

It is advantageous that the method further comprises a step of showing, in a form of a displacement diagram, each of the plurality of transfer position data provided in the form of the cam-reference data.

In this arrangement, the step of designating the pulse-train generating source may include designating, in association with the displacement diagram, the pulse-train generating source with regard to each of the plurality of transfer position data.

Also, the method for controlling may be provided, further comprising a step of designating a time-series allocation of the plurality of transfer position data in the sequence of machining programs on the displacement diagram, wherein the step of processing the transfer position data includes processing, in accordance with the time-series allocation as designated on the displacement diagram, each of the plurality of transfer position data provided in the form of the cam-reference data.

In this arrangement, a structure may be provided, wherein the at least one spindle and the at least one tool rest are capable of performing a relative feed motion along a plurality of control axes, and wherein the step of designating the time-series allocation includes designating, on the displacement diagram, a synchronization between the plurality of transfer position data for respectively operationally controlling the plurality of control axes.

The plurality of pulse-train generating sources may include a spindle-pulse generating source generating a pulse train corresponding to a rotation of the at least one spindle.

Also, the plurality of pulse-train generating sources include an outside-pulse generating source generating a pulse train irrespective of an operation of the automatically operated lathe.

The present invention provides in one aspect thereof an automatically operated lathe, comprising a lathe bed; at least one spindle mounted on the lathe bed; at least one tool rest mounted on the lathe bed; a control device for controlling an operation of the at least one spindle and the at least one tool rest on the lathe bed; and a plurality of pulse-train generating sources, each of which generates any pulse train; the control device including an input section permitting entering of each of a plurality of transfer position data required in a sequence of machining programs in connection with the at least one spindle and the at least one tool rest in a form of a cam-reference data directing a transfer position as a function of a cam rotation quantity, and permitting a designation of a pulse-train generating source for generating a pulse train defining the cam rotation quantity as one component of the cam-reference data, with regard to each of the plurality of transfer position data, the pulse-train generating source being selected from the plurality of pulse-train generating sources; and a processing section processing each of the plurality of transfer position data entered through the input section in the form of the cam-reference data by using the pulse train generated through the pulse-train generating source designated through the input section, to thereby generate a control signal for controlling a relative feed motion between the at least one spindle and the at least one tool rest in the sequence of machining programs.

In the preferred embodiment, an automatically operated lathe is provided, wherein the at least one spindle and the at least one tool rest are capable of performing a relative feed motion along a plurality of control axes on the lathe bed, and wherein the input section of the control device permits a designation of the pulse-train generating source with regard to each of the plurality of transfer position data in relation to each of the plurality of control axes.

In the preferred embodiment, an automatically operated lathe is provided, wherein the input section of the control device permits an designation of a time-series allocation of the plurality of transfer position data in the sequence of machining programs, and wherein the processing section of the control device processes, in accordance with the time-series allocation designated through the input section, each of the plurality of transfer position data entered in the form of the cam-reference data through the input section.

It is advantageous that the control device further includes a display section displaying, in a form of a displacement diagram, each of the plurality of transfer position data entered through the input section in the form of the cam-reference data.

In this arrangement, it is preferred that the input section of the control device permits a designation of the pulse-train generating source with regard to each of the plurality of transfer position data, in association with the displacement diagram displayed in the display section.

Also, the structure may be provided, wherein the input section of the control device permits a designation of a time-series allocation of the plurality of transfer position data in the sequence of machining programs on the displacement diagram displayed in the display section, and wherein the processing section of the control device processes, in accordance with the time-series allocation as designated on the displacement diagram, each of the plurality of transfer position data entered in the form of the cam-reference data through the input section.

In this arrangement, it is preferred that the at least one spindle and the at least one tool rest are capable of performing a relative feed motion along a plurality of control axes on the lathe bed, and that the input section of the control device permits a designation of a synchronization between the plurality of transfer position data for respectively operationally controlling the plurality of control axes, on the displacement diagram displayed in the display section.

The plurality of pulse-train generating sources may include a spindle-pulse generating source generating a pulse train corresponding to a rotation of the at least one spindle.

Also, the plurality of pulse-train generating sources may include an outside-pulse generating source generating a pulse train irrespective of an operation of the automatically operated lathe.

The present invention provides in one aspect thereof a control device for use in an automatically operated lathe provided with at least one spindle and at least one tool rest, comprising an input section permitting an entering of each of a plurality of transfer position data required in a sequence of machining programs in connection with the at least one spindle and the at least one tool rest in a form of a cam-reference data directing a transfer position as a function of a cam rotation quantity, and permitting a designation of a pulse-train generating source for generating a pulse train defining the cam rotation quantity as one component of the cam-reference data, with regard to each of the plurality of transfer position data, the pulse-train generating source being selected from a plurality of pulse-train generating sources as previously provided; and a processing section processing each of the plurality of transfer position data entered through the input section in the form of the cam-reference data by using the pulse train generated through the pulse-train generating source designated through the input section, to thereby generate a control signal for controlling a relative feed motion between the at least one spindle and the at least one tool rest in the sequence of machining programs.

In the preferred embodiment, the control device is provided, wherein the input section permits an designation of a time-series allocation of the plurality of transfer position data in the sequence of machining programs, and wherein the processing section processes, in accordance with the time-series allocation designated through the input section, each of the plurality of transfer position data entered in the form of the cam-reference data through the input section.

It is advantageous that the device further comprises a display section displaying, in a form of a displacement diagram, each of the plurality of transfer position data entered through the input section in the form of the cam-reference data.

In this arrangement, it is preferred that the input section permits a designation of the pulse-train generating source with regard to each of the plurality of transfer position data, in association with the displacement diagram displayed in the display section.

Also, a structure may be provided, wherein the input section permits a designation of a time-series allocation of the plurality of transfer position data in the sequence of machining programs on the displacement diagram displayed in the display section, and wherein the processing section processes, in accordance with the time-series allocation as designated on the displacement diagram, each of the plurality of transfer position data entered in the form of the cam-reference data through the input section.

BRIEF DESCRIPTION OF THE DRAWINGS

The above and other objects, features and advantages of the present invention will become more apparent from the following description of preferred embodiments with reference to the attached drawings, in which:

FIG. 5 is a block diagram showing another system for specifying a cam-rotation quantity of the cam-reference data used in the controlling method of FIG. 1;

FIG. 14 is a displacement diagram representing cam-reference data for the other two control axes used in the machining sequence of FIG. 11;

BEST MODES FOR CARRYING OUT THE INVENTION

Figure 1:
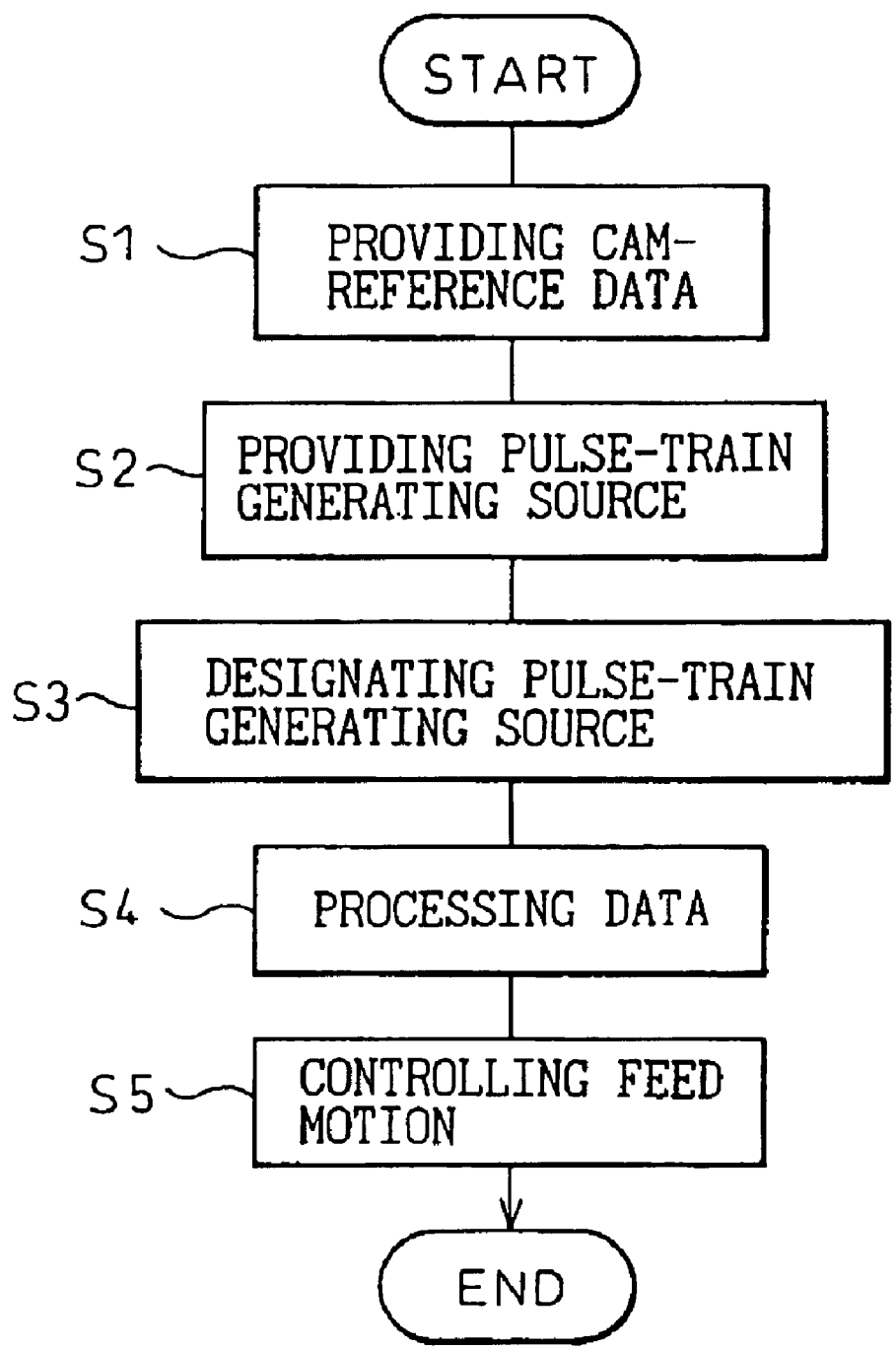
FIG. 1 is a flow chart showing the procedure of a method for controlling an automatically operated lathe, according to an embodiment of the present invention.

With reference to the drawings, FIG. 1 is a flow chart showing the procedure of a controlling method of an automatically operated lathe, according to an embodiment of the present invention, and FIGS. 2A to 3B are displacement diagrams representing one example of plural transfer position data used in this controlling method.

The controlling method of an automatically operated lathe, according to the present invention, is constituted for controlling a relative feed motion between a spindle and a tool rest, which is carried out in accordance with a sequence of machining programs for cutting and machining one product from a workpiece to be machined, in an automatically operated lathe provided with at least one spindle and at least one tool rest. First, as shown in FIG. 1, each of a plurality of target or transfer position data (i.e., travel locus data) required in the sequence of machining programs in connection with at least one spindle and at least one tool rest is provided in the form of a cam-reference data directing a transfer position as a function of a cam rotation quantity (a step S1). Also, a plurality of pulse-train generating sources, each of which generates any pulse train, are provided (a step S2).

Next, a pulse-train generating source for generating a pulse train defining the cam rotation quantity as one component of the cam-reference data is designated, with regard to each of the plural transfer position data provided in the step S1, by selecting the pulse-train generating source from the plural pulse-train generating sources provided in the step S2 (a step S3). Then, each of the plural transfer position data provided in the step S1 is processed by using the pulse train generated through the pulse-train generating source designated in the step S3 (a step 54), and a relative feed motion between at least one spindle and at least one tool rest in the sequence of machining programs is controlled (a step S5).

In the case where at least one spindle and at least one tool rest in the automatically operated lathe are capable of performing the relative feed motion along a plurality of control axes on a lathe bed, the step for designating the pulse-train generating source (the step S3) includes designating the pulse-train generating source with regard to each of the plural transfer position data in relation to each of the plural control axes.

The cam-reference data provided in the step S1 as described is constituted so that a predetermined operation quantity obtained from any mechanically operative component in the automatically operated lathe and/or a predetermined signal quantity obtained from a signal generating component outside the automatically operated lathe is defined to correspond to the single rotation of the cam, and that the transfer positions of the spindle or the tool rest are successively directed on the basis of the operation quantity and/or the signal quantity. Therefore, it is satisfied that the plural pulse-train generating sources provided in the step S2 are capable of respectively converting such an operation quantity obtained from any mechanically operative component in the automatically operated lathe and/or a signal quantity obtained from a signal generating component outside the automatically operated lathe into a form of any pulse trains and capable of outputting the pulse trains. It will be appreciated that the definition of the cam rotation quantity as one component of the cam-reference data by the pulse train, in the way described above, facilitates a data processing in step S4.

In the step S3, in order to ensure that various processes in the sequence of machining programs are capable of being performed under a so-called electronic-cam type control, a pulse-train generating source for generating a pulse train for processing the cam-reference data is designated, with regard to each of the plural transfer position data corresponding to the respective processes, by suitably selecting the pulse-train generating source from the plural pulse-train generating sources as described. Then, in the steps S4 and S5, the relative feed motions between the spindle and the tool stock in the various processes are surely controlled in the electronic-cam system by effectively using the pulse train generating sources as respectively designated.

According to this arrangement, a so-called electronic-cam type control is carried out in all of the various processes in the sequence of machining programs, which permits the operation of the plural control axes in the automatically operated lathe to be individually and freely controlled, and therefore, the idle time of tools is easily eliminated and the time required for one machining cycle is effectively reduced in comparison with a conventional NC lathe. Moreover, in each process, it is possible to prepare the displacement diagrams (or cam diagrams) regarding the respective control axes on the common reference (i.e., the cam rotation quantity), which facilitates the programming of a synchronizing command of the control axes.

In particular, according to the present invention, it is possible to surely perform the various processes in the sequence of machining programs under the electronic-cam type control by effectively using the pulse-train generating sources respectively designated with regard to each of the plural transfer position data corresponding to the respective processes. Therefore, remarkable effects are obtainable in which it is possible, for example, to surely perform, on the basis of the cam-reference data, the secondary process (e.g., a cutting process by a rotary tool) performing while the spindle is halted, by designating the desired pulse-train generating source which converts an operation quantity obtained from a mechanically operative component other than the spindle and/or a signal quantity obtained from a signal generating component outside the automatically operated lathe into a form of any pulse train and outputs the pulse train.

In the above-described control flow according to the present invention, a step for designating the time-series allocation of the plural transfer position data in the sequence of machining programs may be additionally provided, in association with the step S3 of designating the pulse-train generating source. According to this step, it is possible to arrange, in the most suitable order, various processes corresponding to the plural transfer position data for which the desired pulse-train generating sources are respectively designated. Accordingly, in the steps S4 and S5, each of the plural transfer position data provided in the form of the cam-reference data is processed in accordance with the time-series allocation as designated, whereby the relative feed motion between the spindle and the tool rest is controlled, in each of the various processes arranged in the most suitable order, in a way as to follow this order.

Also, in the above-described control flow according to the present invention, a step for showing, in the form of a displacement diagram (a cam diagram) representing a locus of transfer positions (e.g., a tool path), each of the plural transfer position data provided in the form of cam-reference data, may be added in association with the step S1 for providing the transfer position data. In this case, it is advantageous to permit the step S3, of designating the pulse-train generating source, to designate, in association with the displacement diagram, the pulse-train generating source with regard to each of the plural transfer position data. It is also advantageous to permit the above-described step, of designating the time-series allocation of the plural transfer position data in the sequence of machining programs, to designate the time-series allocation on the shown displacement diagram.

Figure 2A:
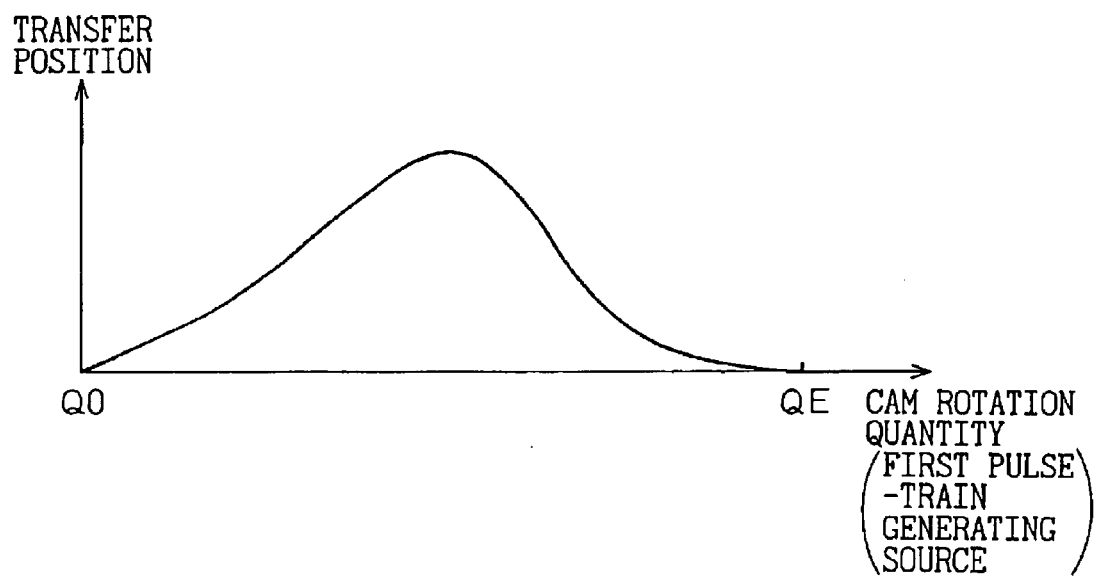
FIG. 2A is a displacement diagram representing one example of a cam-reference data used in the controlling method of FIG. 1.
Figure 2B:
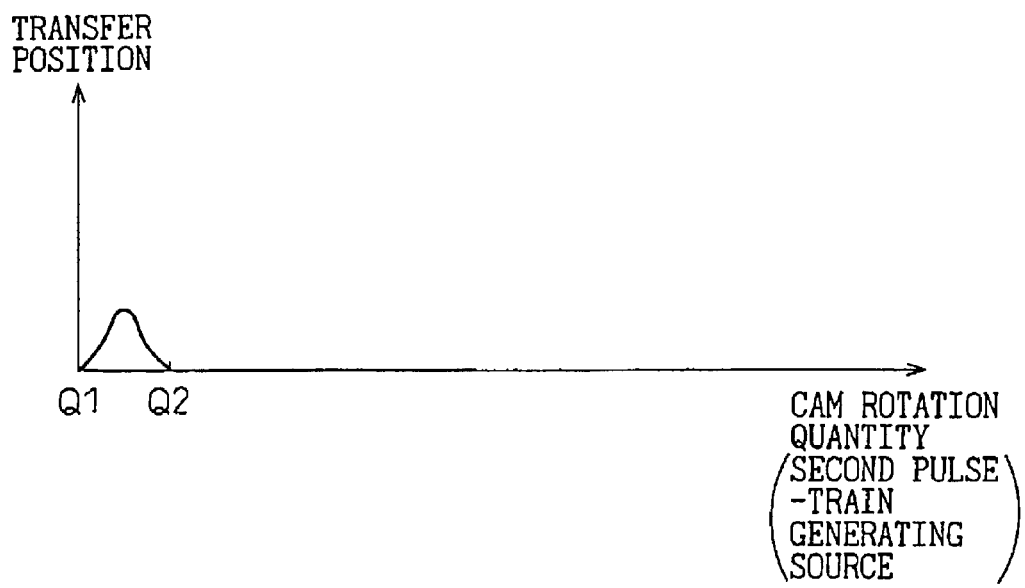
FIG. 2B is a displacement diagram representing one example of another cam-reference data used in the controlling method of FIG. 1.

FIGS. 2A and 2B are displacement diagrams (or cam diagrams) respectively representing examples of two different transfer position data provided in the form of cam-reference data. In this respect, a first pulse-train generating source generating a pulse train for processing the first cam-reference data shown in FIG. 2A is designated in association with the displacement diagram of FIG. 2A. Also, a second pulse-train generating source generating a pulse train for processing the second cam-reference data shown in FIG. 2B is designated in association with the displacement diagram of FIG. 2B. In these examples, most of the sequence of machining programs (Q0 to QE) is carried out on the basis of the first cam-reference data, and only a specific program (Q1 to Q2) is carried out on the basis of the second cam-reference data.

Figure 3A:
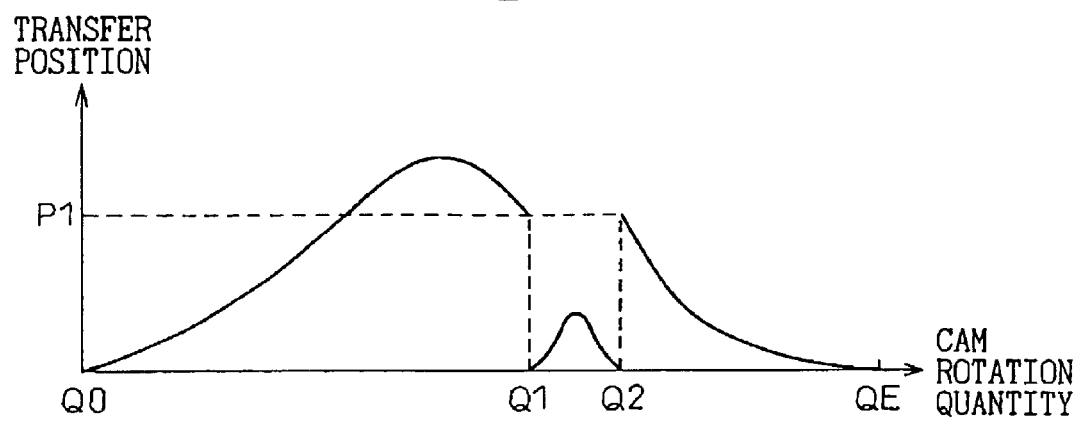
FIG. 3A is a displacement diagram representing composed cam-reference data of FIGS. 2A and 2B.

Then, the time-series allocation of these two transfer position data may be designated on either one of the displacement diagrams. In the illustrated examples, a location where the second cam-reference data represented in the displacement diagram of FIG. 2B interrupts is designated on the displacement diagram of FIG. 2A. FIG. 3A shows one example of a composite displacement diagram representing the transfer position data in the sequence of machining programs, in a state after the interruption by the cam-reference data associated with the different pulse-train generating source is designated.

Therefore, in this example of a machining sequence, during a condition where the cam rotation quantity advances from Q0 to Q1, the relative feed motion between the spindle and the tool rest is controlled on the basis of the first cam-reference data processed by using the first pulse-train generating source, and, during a condition where the cam rotation quantity advances from Q1 to Q2, the relative feed motion between the spindle and the tool rest is controlled on the basis of the second cam-reference data processed by using the second pulse-train generating source. Thereafter, during a condition where the cam rotation quantity advances from Q2 to QE, the relative feed motion between the spindle and the tool rest is controlled again on the basis of the first cam-reference data. In this manner, one machining cycle is completed.

Figure 3B:
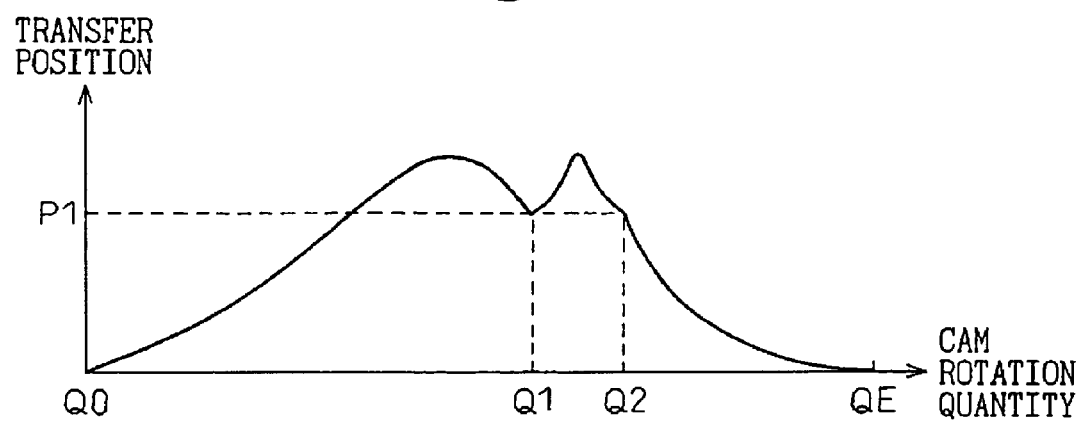
FIG. 3B is another displacement diagram representing composed cam-reference data of FIGS. 2A and 2B.

In the above machining sequence example, if the control axis operationally controlled on the basis of the first cam-reference data is different from the control axis operationally controlled on the basis of the second cam-reference data, it is possible to allocate the displacement diagram representing the second cam-reference data irrespective of the transfer position P1 at the interrupted location on the displacement diagram of the first cam-reference data, as shown in FIG. 3A. Contrary to this, if the interruption by the second cam-reference data to the first cam-reference data is performed on the same control axis, the displacement diagram representing the second cam-reference data is allocated in such a manner as to continue the transfer position P1 at the interrupted location on the displacement diagram of the first cam-reference data, as shown in FIG. 3B.

In the above machining sequence example, the first pulse-train generating source may be constructed from, for example, a spindle-pulse generating source generating a pulse train corresponding to a rotation of at least one spindle of the automatically operated lathe. Also, the second pulse-train generating source may be constructed from, for example, a tool-pulse generating source generating a pulse train corresponding to a rotation of the rotary tool carried on at least one tool rest of the automatically operated lathe.

Figure 4:
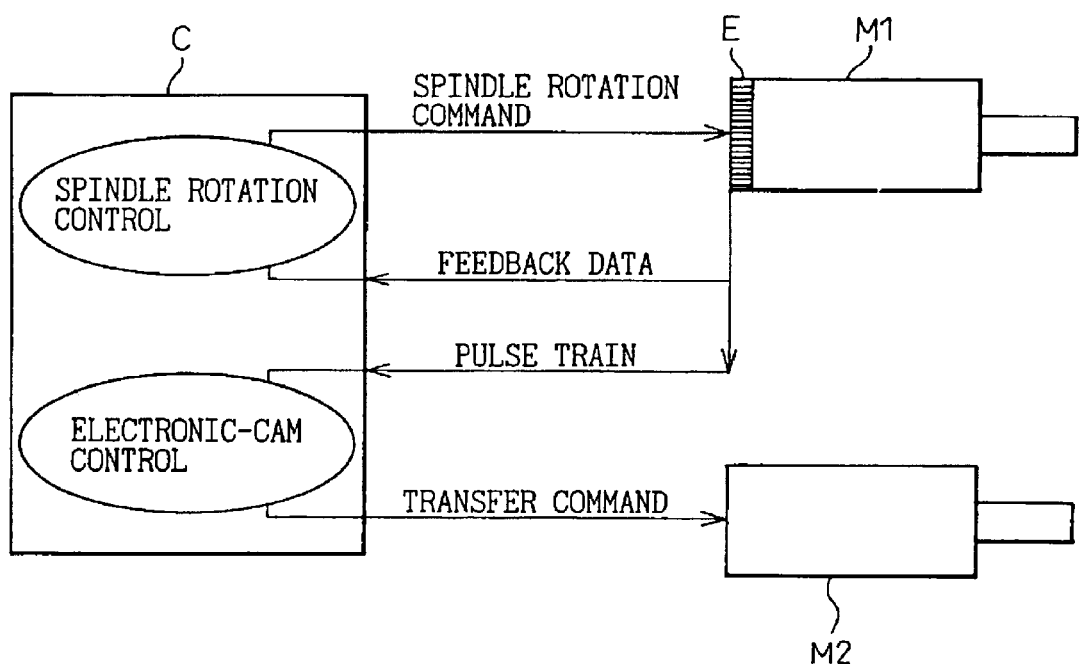
FIG. 4 is a block diagram showing a system for specifying a cam-rotation quantity of the cam-reference data used in the controlling method of FIG. 1.

For example, as shown in FIG. 4, an encoder E provided in a spindle motor M1 may be used as the spindle-pulse generating source. In this case, it is advisable that a control device C installed in the automatically operated lathe is constituted to use a pulse train output from the encoder E for a spindle rotation control as a feedback data as well as for processing the cam-reference data in the above-described electronic-cam control. In this arrangement, the control device C operates and processes the transfer positions directed through the cam-reference data by using the pulse train acquired from the encoder E, and outputs a transfer command based thereon so as to control the operation of a control axis motor M2. In the same manner, but not illustrated, an encoder provided in a drive motor for a tool rotation may be used as the tool-pulse generating source.

Incidentally, in the structure wherein a drive force from the spindle motor M1 is transmitted to the spindle through a transmission mechanism such as a belt/pulley, the rotational frequency of the spindle motor M1, detected by the encoder E, tends to become different from the actual rotational frequency of the spindle securely holding a workpiece to be machined, when a slip is caused in the transmission mechanism by, e.g., the machining load during a turning process. In this case, in the electronic-cam control on the basis of the rotational frequency of the spindle motor M1, the spindle and the tool rest are operated to perform the relative feed motion in accordance with the rotational frequency of the spindle motor M1 irrespective of the actual machining progress of the workpiece, which may cause deterioration of the machining accuracy.

To eliminate such a problem, a rotation detector D for detecting the actual rotational frequency of a spindle S, from which the pulse train is acquired for the electronic-cam control, is advantageously used as the spindle-pulse generating source, as shown in FIG. 5. In this arrangement, a control device C operates and processes the transfer positions directed through the cam-reference data by using the pulse train acquired from the rotation detector D, and outputs a transfer command based thereon so as to control the operation of a control axis motor M2. Therefore, even when the slip is caused in a transmission mechanism T by, e.g., the machining load during a turning process, it is ensured that the pulse train acquired from the rotation detector D corresponds to the actual rotational frequency of a workpiece W to be machined. As a result, when the electronic-cam control on the basis of a spindle rotational frequency is performed, the relative feed motion between the spindle and the tool rest accurately matches to the actual machining progress of the workpiece w, which makes it possible to maintain a high machining accuracy.

It is also advisable to constitute at least one of the plural pulse-train generating sources required for the electronic-cam control as described above from an outside-pulse generating source generating a pulse train irrespective of an operation of the automatically operated lathe, such as a clock signal generator (not shown) installed within, e.g., a control device inherent in the automatically operated lathe or a personal computer outside of the automatically operated lathe. In this arrangement, the cam-reference data is processed by using a certain outside pulse train (e.g., a clock pulse train) generated irrespective of the operating situation of the mechanically operative component of the automatically operated lathe.

Figure 6A:
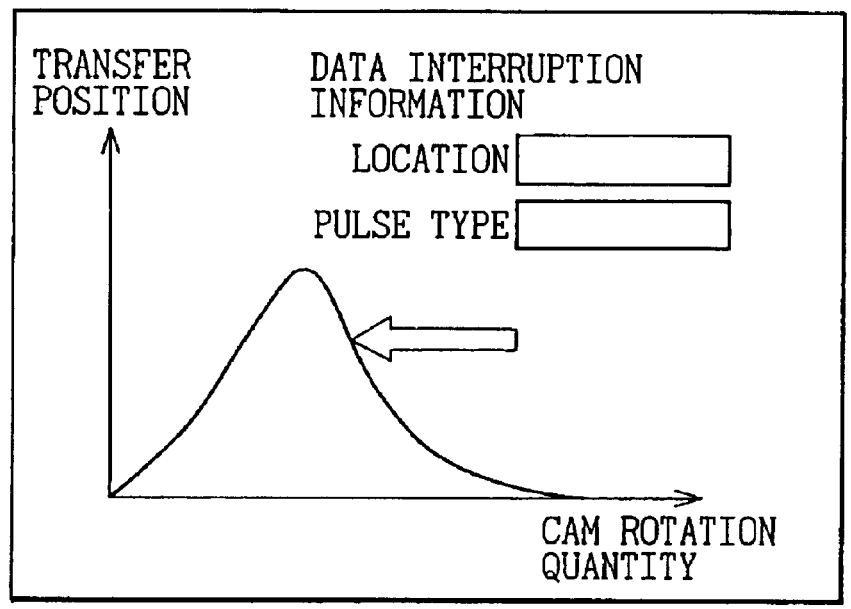
FIGS. 6A and 6B are illustrations of display screen pictures, showing a procedure for directing a data interruption information in the controlling method of FIG. 1.

As described with reference to the above machining sequence example, when the time-series allocation of the plural cam-reference data in the sequence of machining programs and/or the pulse-train generating source used in the processing step of each cam-reference data is designated on the displacement diagrams, it is advantageous that the desired displacement diagram is displayed on a display screen provided, e.g., in association with the control device of the automatically operated lathe. In this case, as shown in FIG. 6A, a pulse-train generating source (a pulse type) used for processing the second cam-reference data for interruption may be directed by describing it inside a predetermined blank as displayed, and a location where the second cam-reference data interrupts may be directed by a screen picture such as an arrow, on the screen displaying the displacement diagram of the first cam-reference data in which a pulse-train generating source is previously determined. Alternatively, the location for the interruption may be directed by entering a numerical data, such as a cam rotation angle, the number of pulse or a process number (e.g., a tool number).

Figure 6B:
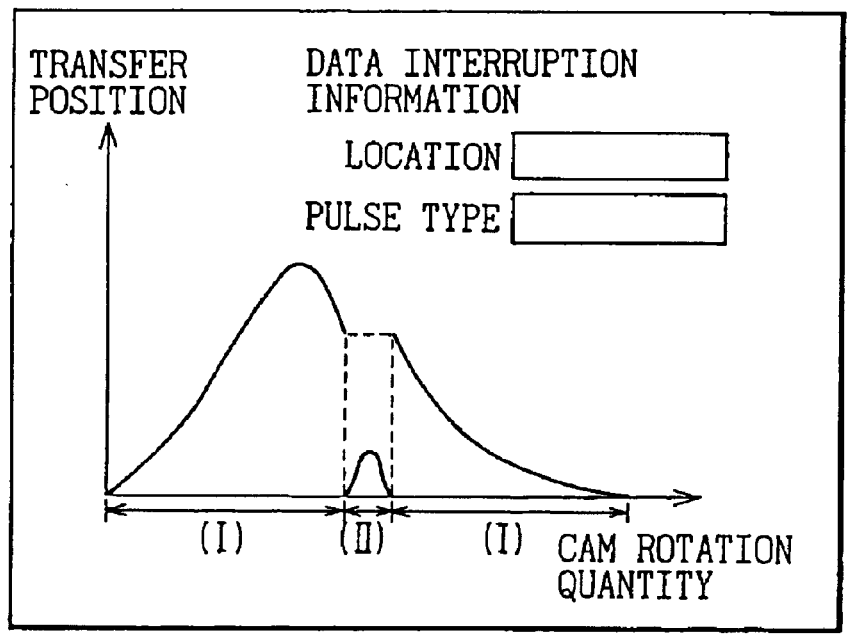

As shown in FIG. 6B, it is possible to display the resultant composite displacement diagram on the screen in the same way. In the composite displacement diagram of FIG. 6B, when the cam-reference data is processed in a region (I) of cam rotation quantity, the cam rotation quantity is defined by the number of pulse (or a pulse number) counted in a pulse train generated from the first pulse-train generating source. Also, when the cam-reference data is processed in a region (II) of cam rotation quantity, the cam rotation quantity is defined by a pulse number counted in a pulse train generated from the second pulse-train generating source.

It will be appreciated that the preparation of the above-described displacement diagrams may be performed not only in the control device previously installed in the automatically operated lathe, but also in an outside computer.

Following is the description of the constitution of an automatically operated lathe 10 (see FIG. 7) as well as of a control device 12 (see FIG. 8) installed in the automatically operated lathe 10, each according to one embodiment of the present invention, and each capable of carrying out the automatically operated lathe controlling method according to the invention. The automatically operated lathe 10 includes two spindles 16, 18 and two tool rests 20, 22, intensively mounted on a common lathe bed 14, and has a multifunctional arrangement capable of performing a simultaneous machining of different processes (e.g., an outer-diametrical turning and a boring) for an identical workpiece and/or a simultaneous machining for different workpieces by various tools including a cutting tool 24 for a turning process, such as a turning tool or a drill, and a rotary tool 26 such as a milling cutter.

Figure 7:
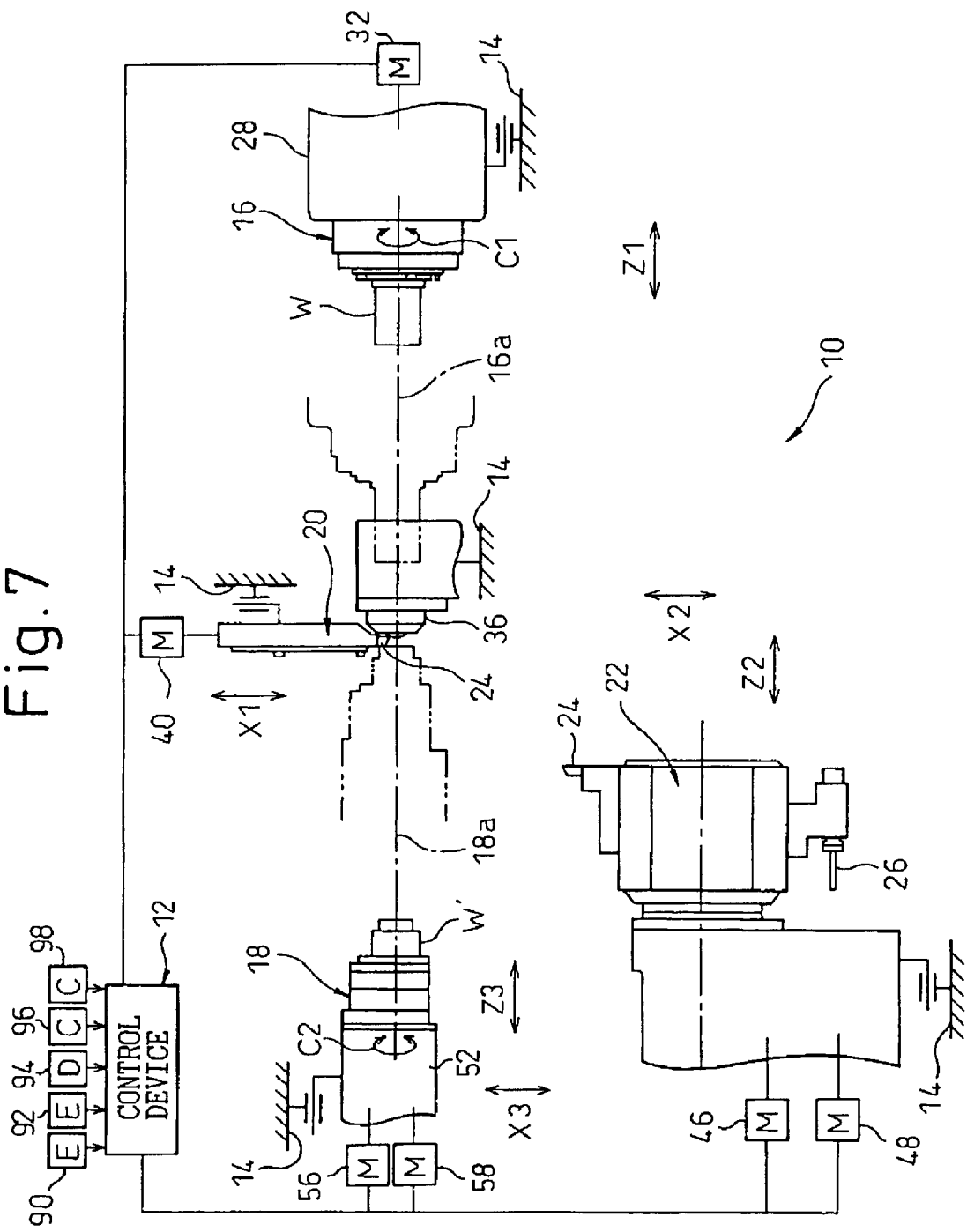
FIG. 7 is a schematic illustration showing the constitution of an automatically operated lathe, according to one embodiment of the present invention, which can perform the controlling method of FIG. 1.

As shown in FIG. 7, the automatically operated lathe 10 includes a lathe bad 14, a first spindle 16 mounted on the lathe bed 14 and having a rotation axis 16a, a first tool rest 20 mounted on the lathe bed 14 and capable of holding a plurality of tools 24, 26 in parallel rows, a second tool rest 22 mounted on the lathe bed 14 and capable of holding a plurality of tools 24, 26 in a circumferentially distributed manner, a second spindle 18 mounted on the lathe bed 14 and having a rotation axis 18a parallel to the rotation axis 16a of the first spindle 16 to be capable of oppositely facing the first spindle 16, and a control device 12 for controlling the operation of the first and second spindles 16, 18 as well as of the first and second tool rests 20, 22 on the lathe bed 14.

The lathe bed 14 carries, independently, the first spindle 16, the second spindle 18, the first tool rest 20 and the second tool rest 22 in a respectively movable manner in a predetermined rectangular coordinate system.

The first spindle 16 is a main (or front-side) spindle which securely holds a bar-shaped workpiece w to be machined (hereinafter referred to as a bar) supplied from an outside of the lathe and rotates therewith, and is rotatably supported within a first spindle stock 28 through a bearing unit not illustrated. The first spindle 16 has a hollow tubular structure, and is equipped at the front end region thereof with a chuck (not shown) capable of firmly and securely holding the bar W supplied from the rear end region. The lathe bed 14 is equipped with a first spindle drive mechanism 30 (FIG. 8) for linearly transferring the first spindle stock 28 along a first feed-control axis (referred to as a Z1-axis) parallel to the rotation axis 16a of the first spindle 16 in a three-axis rectangular coordinate system defined on the lathe bed 14.

The first spindle drive mechanism 30 is constituted from a Z1-axis drive source (e.g., an AC servo motor) 32, as well as a Z1-axis guide member (e.g., a slide guide) and a feed screw unit (e.g., a ball screw), both not illustrated. Consequently, the first spindle 16 is capable of linearly reciprocating along the first feed-control axis (Z1-axis) parallel to its own rotation axis 16a, together with the first spindle stock 28, due to the operation of the first spindle drive mechanism 30.

The first spindle stock 28 is also equipped therein with a rotation drive source 34 (FIG. 8), such as a built-in AC servo motor, for rotationally driving the first spindle 16. Also, the first spindle 16 may have a rotation-angle control axis (referred to as a C1-axis), which makes it possible to perform various secondary machining processes at desired positions on the end and/or circumferential surface of the bar W securely held by the chuck, by using rotary tools 26 carried on the desired tool rests 20, 22, due to an indexable positioning operation in the C1-axis obtained by controlling the rotation drive source 34.

The lathe bed 14 is equipped, at a predetermined location spaced axially forward from the first spindle stock 28, with a guide bush 36 as an auxiliary support unit for supporting the bar W securely held in the first spindle 16 at a position near a leading end length to be machined of the bar. The guide bush 36 is disposed coaxially relative to the first spindle 16 and supports the bar W in a centering manner so as to prevent the length to be machined of the bar from running-out during the turning process thereof.

Figure 8:
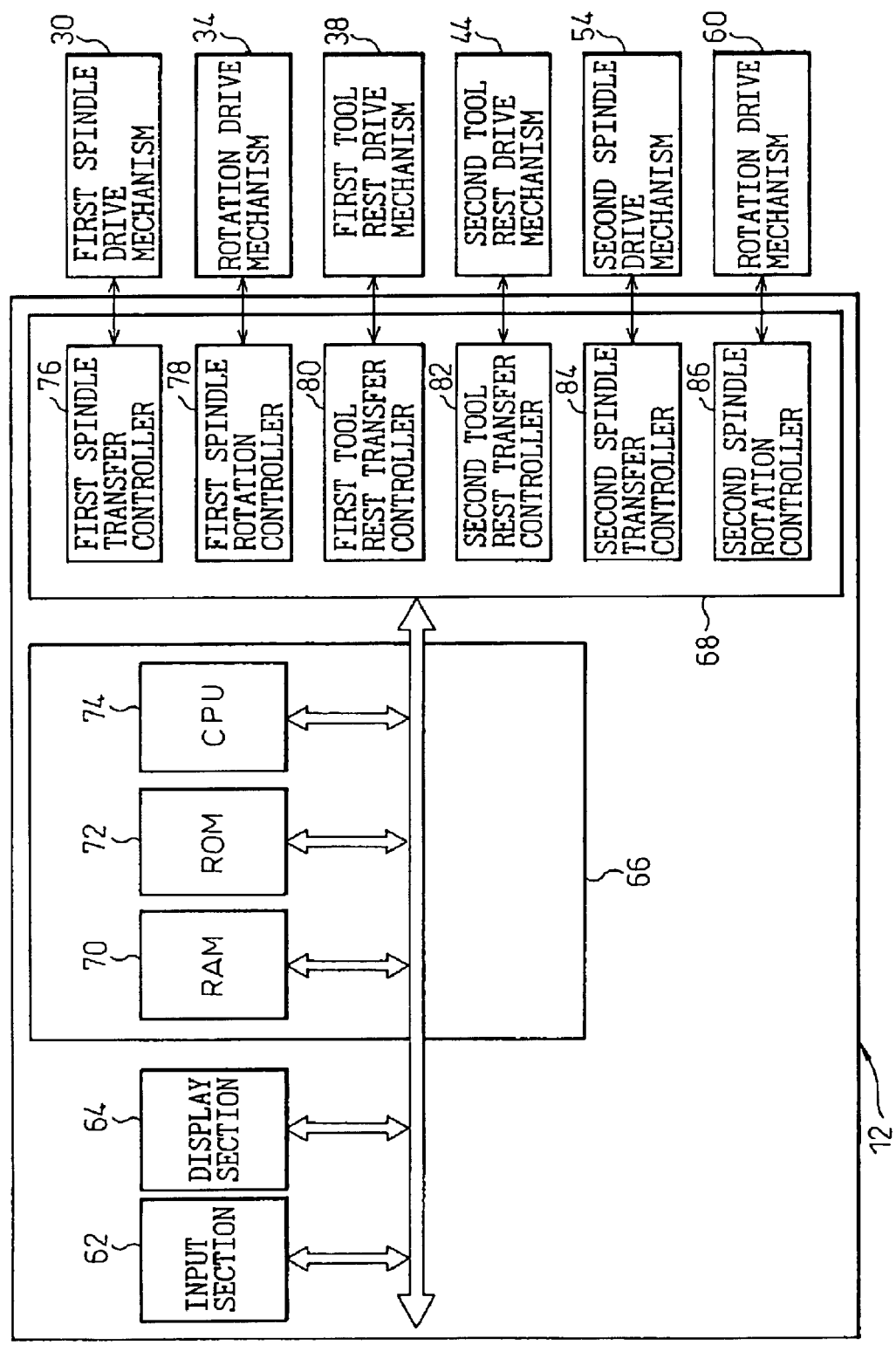
FIG. 8 is a block diagram showing the constitution of a control device installed in the automatically operated lathe of FIG. 7.
Figure 9:
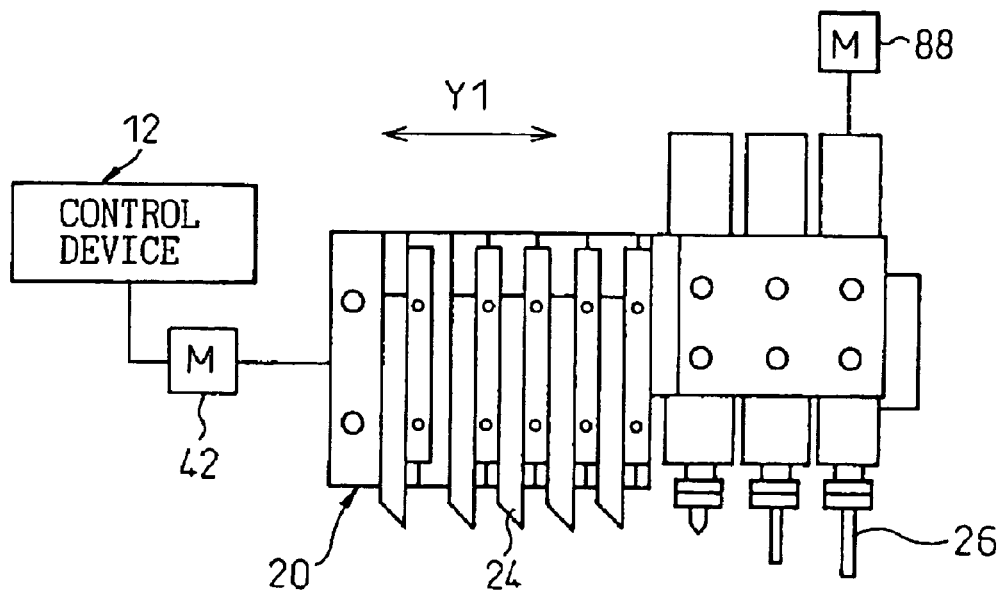
FIG. 9 is an enlarged front view of a first tool rest mounted on the automatically operated lathe of FIG. 7.

The first tool rest 20 is disposed on the lathe bed 14 at a location laterally retreated from the guide bush 36 positioned axially forward of the first spindle 16. The lathe bed 14 is equipped with a first tool rest drive mechanism 38 (FIG. 8) for linearly transferring the first tool rest 20 along a second feed-control axis (referred to as an X1-axis) parallel to the rotation axis 16a of the first spindle 16 (i.e., the first feed-control axis (Z1-axis)) in a three-axis rectangular coordinate system defined on the lathe bed 14. As shown in FIG. 9, the first tool rest drive mechanism 38 is capable of linearly transferring the first tool rest 20 along a third feed-control axis (referred to as a Y1-axis) orthogonal to both the first feed-control axis (Z1-axis) and the second feed-control axis (X1-axis).

The first tool rest drive mechanism 38 is constituted from an X1-axis drive source (e.g., an AC servo motor) 40, an X1-axis guide member (e.g., a slide guide) and a feed screw unit (e.g., a ball screw), both not illustrated, as well as a Y1-axis drive source (e.g., an AC servo motor) 42 (FIG. 9), a Y1-axis guide member (e.g., a slide guide) and a feed screw unit (e.g., a ball screw), both not illustrated. Consequently, the first tool rest 20 is capable of linearly reciprocating along the second feed-control axis (X1-axis) and the third feed-control axis (Y1-axis) due to the operation of the first tool rest drive mechanism 38.

The first tool rest 20 is a so-called flat turret tool rest capable of holding a plurality of tools 24, 26 in parallel rows. Therefore, the first tool rest 20 is capable of transferring, along a designated tool path, the cutting edge of the desired tool 24, 26 selected in an indexing manner by the Y1-axis motion of the first tool rest, due to the cooperation of the X1-axis feed motion of the first tool rest 20 and the above-described Z1-axis feed motion of the first spindle 16 according to the machining programs as described later. Consequently, it is possible to machine the bar w securely held in the first spindle 16 into a desired shape by using desired tools 24, 26 on the first tool rest 20.

In the illustrated embodiment, the second tool rest 22 is disposed on the lathe bed 14 at a location opposite to the first tool rest 20 in relation to the rotation axis 16a of the first spindle 16. The lathe bed 14 is equipped with a second tool rest drive mechanism 44 (FIG. 8) for linearly transferring the second tool rest 22 along a fourth feed-control axis (referred to as an X2-axis) orthogonal to the rotation axis 16a of the first spindle 16 (i.e., the first feed-control axis (Z1-axis)) and a fifth feed-control axis (referred to as a Z2-axis) parallel to the first feed-control axis (Z1-axis), respectively, in a two-axis rectangular coordinate system defined on the lathe bed 14.

The second tool rest drive mechanism 44 is constituted from an X2-axis drive source (e.g., an AC servo motor) 46, an X2-axis guide member (e.g., a slide guide) and a feed screw unit (e.g., a ball screw), both not illustrated, as well as a Z2-axis drive source (e.g., an AC servo motor) 48, a Z2-axis guide member (e.g., a slide guide) and a feed screw unit (e.g., a ball screw), both not illustrated. Consequently, the second tool rest 22 is capable of linearly reciprocating along the fourth feed-control axis (X2-axis) and the fifth feed-control axis (Z2-axis) due to the operation of the second tool rest drive mechanism 44.

Figure 10:
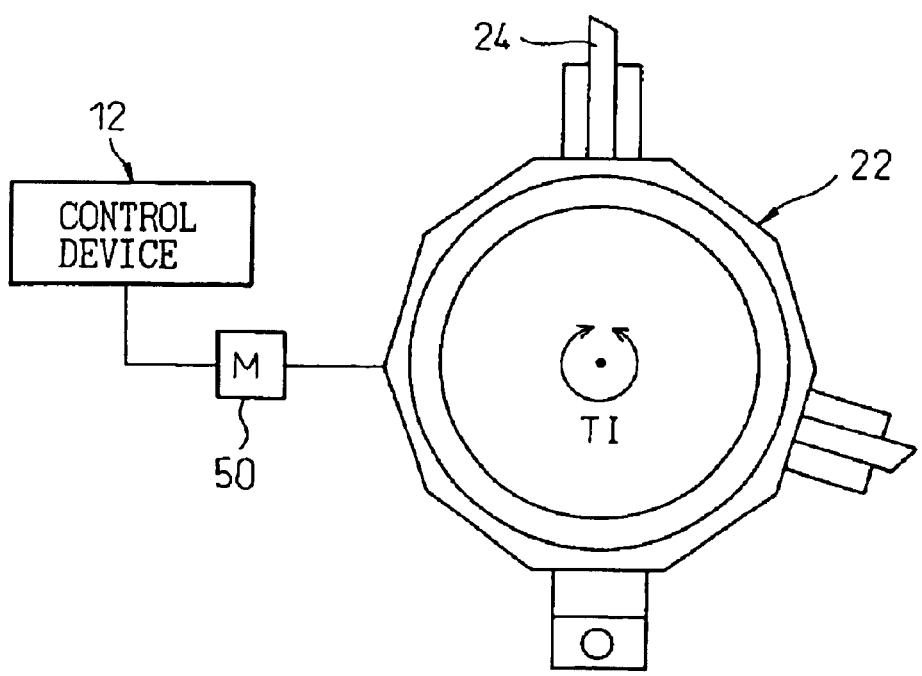
FIG. 10 is an enlarged front view of a second tool rest mounted on the automatically operated lathe of FIG. 7.

The second tool rest 22 is a so-called turret tool rest capable of holding a plurality of tools 24, 26 in a circumferentially distributed manner, and rotates in an indexing manner about a rotationally index-control axis (referred to as a TI axis) parallel to the Z2-axis due to the operation of an index drive source 50 (e.g., an AC servo motor), as shown in FIG. 10. Therefore, the second tool rest 22 is capable of transferring, along a designated tool path, the cutting edge of the desired tool 24, 26 selected in an indexing manner by the TI-axis rotation of the second tool rest, due to the cooperation of the X2-axis feed motion and the Z2-axis feed motion of the second tool rest 22 according to the machining programs as described later. Consequently, it is possible to machine the bar W securely held in the first or second spindle 16, 18 into a desired shape by using desired tools 24, 26 on the second tool rest 22.

The second spindle 18 is disposed on the lathe bed 14 at a location axially forward of the first spindle 16 or the guide bush 36 with the rotation axis 18a being parallel to the rotation axis 16a of the first spindle 16 so as to be capable of oppositely facing the guide bush in a coaxial manner. The second spindle 18 is an auxiliary (or rear-side) spindle which securely holds a bar W' as a blank passed from the first spindle 16 and rotates therewith, and is rotatably supported within a second spindle stock 52 through a bearing unit not illustrated. The second spindle 18 has a hollow tubular structure, and is equipped at the front end region thereof with a chuck (not shown) capable of firmly and securely holding the bar W fed from the opposed guide bush 36.

The lathe bed 14 is equipped with a second spindle drive mechanism 54 (FIG. 8) for linearly transferring the second spindle stock 52 along a sixth feed-control axis (referred to as an X3-axis) orthogonal to the first feed-control axis (Z1-axis) of the first spindle 16 and a seventh feed-control axis (referred to as a Z3-axis) parallel to the first feed-control axis (Z1-axis), respectively, in a two-axis rectangular coordinate system defined on the lathe bed 14.

The second spindle drive mechanism 54 is constituted from an X3-axis drive source (e.g., an AC servo motor) 56, an X3-axis guide member (e.g., a slide guide) and a feed screw unit (e.g., a ball screw), both not illustrated, as well as a Z3-axis drive source (e.g., an AC servo motor) 58, a Z3-axis guide member (e.g., a slide guide) and a feed screw unit (e.g., a ball screw), both not illustrated. Consequently, the second spindle 18 is capable of linearly reciprocating along the sixth feed-control axis (X3-axis) and the seventh feed-control axis (Z3-axis), together with the second spindle stock 52, respectively, due to the operation of the second spindle drive mechanism 54.

The second spindle stock 52 is also equipped therein with a rotation drive source 60 (FIG. 8), such as a built-in AC servo motor, for rotationally driving the second spindle 18. Also, the second spindle 18 may have a rotation-angle control axis (referred to as a C2-axis), which makes it possible to perform various secondary machining processes at desired positions on the end and/or circumferential surface of the bar W securely held by the chuck, by using rotary tools 26 carried on the second tool rest 22, due to an indexable positioning operation in the C2-axis obtained by controlling the rotation drive source 60.

The automatically operated lathe 10 is constructed so as to automatically and respectively machine the bars W, W' securely held in the front-side spindle 16 and the rear-side spindle 18, by using the desired tools 24, 26 in the two tool rests 20, 22 having the above structure, under the control of the control device 12. FIG. 8 shows the constitution of the control device 12 for carrying out such an automatic machining.

The control device 12 includes an input section 62, a display section 64, an arithmetic control section 66 and a servo control section 68. The input section 62 includes a keyboard or a pointing device, not illustrated, and makes it possible for an operator to enter directions and data in an interactive manner while referring various screens displayed in the display section 64. In the automatically operated lathe 10, data (such as a tool selection, a product's shape and dimension, a spindle rotation frequency, a tool feed rate, etc.) required for controlling the operation of each of the first and second spindles 16, 18 as well as the first and second tool rests 20, 22 are entered through the input section 62. The display section 64 includes a display unit, such as a CRT (cathode-ray tube) or an LCD (liquid crystal display), not illustrated, and displays data input images and/or prepared machining programs so as to permit an interactive entering operation by an operator.

The arithmetic control section 66 includes a RAM (random access memory) 70 and a ROM (read only memory) 72, both constituting a storage section, as well as a CPU (central processing unit) 74 constituting a processing section. The various kinds of data entered through the input section 62 are stored in the RAM 70 or the ROM 72 under the instructions from the CPU 74. The ROM 72 also previously stores a controlling program for operating the first and second spindles 16, 18 as well as the first and second tool rests 20, 22. The CPU 74 outputs a controlling command on the basis of the data stored in the RAM 70 or the ROM 72 to the servo control section 68 in accordance with a machining program prepared through a procedure as described later and the controlling program stored in the ROM 72.

The servo control section 68 includes a first spindle transfer controller 76, a first spindle rotation controller 78, a first tool rest transfer controller 80, a second tool rest transfer controller 82, a second spindle transfer controller 84 and a second spindle rotation controller 86. The first spindle transfer controller 76 operates, under the command from the CPU 74, the Z1-axis drive source 32 of the first spindle drive mechanism 30 so as to transfer the first spindle 16 along the Z1-axis together with the first spindle stock 28. The first spindle rotation controller 78 operates, under the command from the CPU 74, the rotation drive source 34 so as to rotate the first spindle 16 on the C1-axis in the first spindle stock 28. In this respect, the high-speed rotation of the first spindle 16 for a turning process is controlled through another control circuit, not illustrated, on the basis of data such as a rotational frequency.

The first tool rest transfer controller 80 operates, under the command from the CPU 74, either the X1-axis drive source 40 or the Y1-axis drive source 42 of the first tool rest drive mechanism 38 so as to transfer the first tool rest 20 along the X1-axis or the Y1-axis. The second tool rest transfer controller 82 operates, under the command from the CPU 74, either the X2-axis drive source 46 or the Z2-axis drive source 48 of the second tool rest drive mechanism 44 so as to transfer the second tool rest 22 along the X2-axis or the Z2-axis.

The second spindle transfer controller 84 operates, under the command from the CPU 74, either the X3-axis drive source 56 or the Z3-axis drive source 58 of the second spindle drive mechanism 54 so as to transfer the second spindle 18 along the X3-axis or the Z3-axis. The second spindle rotation controller 86 operates, under the command from the CPU 74, the rotation drive source 60 so as to rotate the second spindle 18 on the C2-axis in the second spindle stock 52. In this respect, the high-speed rotation of the second spindle 18 for a turning process is controlled through another control circuit, not illustrated, on the basis of data such as a rotational frequency.

It will be appreciated that the constitution of the control device 12 as shown by the block diagram of FIG. 8 corresponds to the constitution of a conventional numerical controlled (NC) lathe. However, the control device 12 of the present invention is not limited to this block diagram but may have various other constitutions.

The control device 12, constituting the above-described control system, adopts the characteristic features as described below, for carrying out the automatically operated lathe controlling method according to the invention so as to have the automatically operated lathe 10 fully exert the multifunctional properties inherent therein and to enable the sequence of machining programs for the bars W, W' to be surely performed under the electronic-cam control system.

That is, the input section 62 permits an entering of each of a plurality of target or transfer position data, required in a sequence of machining programs in connection with the first and second spindles 16, 18 and the first and second tool rests 20, 22 of the automatically operated lathe 10, in the form of a cam-reference data directing a transfer position as a function of a cam rotation quantity. Also, the input section 62 permits a designation of a pulse-train generating source for generating a pulse train defining the cam rotation quantity as one component of the cam-reference data, with regard to each of the plural transfer position data, by selecting the pulse-train generating source from the plural pulse-train generating sources as previously provided.

Particularly, in the control device 12, the input section 62 is structured to permit the designation of the pulse-train generating source with regard to each of the plural transfer position data, in relation to each of the plural control axes (X1, Y1, Z1, X2, Z2, X3, Z3) of the automatically operated lathe 10. In the input section 62, the pulse-train generating source should be suitably selected and designated for each of the plural processes performed through the sequence of machining programs, provided that the pulse train for processing the transfer position data required for each control axis is surely and continuously acquired during the process concerned.

In this respect, in the automatically operated lathe 10, it is possible to have the rotation drive sources 34, 60 of the first and second spindle 16, 18 and the rotation drive source 88 (FIG. 9) of any rotary tool 26 functioned as the plural pulse-train generating sources which are suitably selectable. In this case, it is advisable that the CPU 74 of the control device 12 is arranged so as to use a pulse train generated from an encoder 90 (FIG. 7) provided in a built-in AC servo motor as a rotation drive source 34, 60 of the first or second spindle 16, 18, or from an encoder 92 (FIG. 7) provided in an AC servo motor as a rotation drive source 88 of the rotary tool 26, for a rotation control of spindle or tool concerned, as well as for processing the cam-reference data in the above-described electronic-cam control, as already described with reference to FIG. 4. In this arrangement, the CPU 74 operates and processes the transfer positions directed through the cam-reference data by using the pulse trains acquired from the desired encoders 90, 92, and outputs a transfer command based thereon to the servo control section 68. Consequently, the operation of the respective axis drive sources 32, 40, 42, 46, 48, 56, 58 of the respective control-axis drive mechanisms 30, 38, 44, 54 are controlled on the basis of the cam-reference data.

Moreover, in the automatically operated lathe 10, it is also possible to previously provide a plurality of pulse-train generating sources constituted from a spindle-pulse generating source including a rotation detector 94 (FIG. 7) as described with reference to FIG. 5, and an outside-pulse generating source such as a clock signal generator 96 (FIG. 7) installed within the control device 12 or a clock signal generator 98 (FIG. 7) installed within a personal computer, etc., outside of the automatically operated lathe.

The CPU 74 of the arithmetic control section 66 processes each of the plural transfer position data entered through the input section 62 in the form of the cam-reference data, by using the pulse train generated through the pulse-train generating source 90, 92, 94, 96, 98 designated through the input section 62. Then, the CPU 74 generates a control signal for controlling a relative feed motion between the first and second spindles 16, 18 and the first and second tool rests 20, 22 in the sequence of machining programs, so as to output it to the servo control section 68.

Also, in the input section 62, it is possible to designate the time-series allocation of the plural transfer position data in the sequence of machining programs, in relation to each of the plural control axes (X1, Y1, Z1, X2, Z2, X3, Z3) of the automatically operated lathe 10. Thereby, plural processes performed on the basis of the cam-reference data processed by using different pulse-train generating sources are arranged in the most suitable order. Accordingly, the CPU 74 of the arithmetic control section 66 processes each of the plural transfer position data respectively entered in the form of the cam-reference data, in accordance with the time-series allocation designated through the input section 62, and generates a control signal for controlling a relative feed motion between the first and second spindles 16, 18 and the first and second tool rests 20, 22, so as to output it to the servo control section 68. In this manner, the plural processes in the sequence of machining programs are performed in the most suitable order.

The display section 64 of the control device 12 is capable of displaying each of the plural transfer position data, respectively entered through the input section 62 in the form of the cam-reference data, in the form of a displacement diagram representing a locus of transfer positions (e.g., a tool path). The input section 62 permits a designation of the time-series allocation of the plural cam-reference data using different pulse-train generating sources on any one displacement diagram displayed in the display section 64, as described with reference to FIG. 6A.

According to the above constitution, it is possible for the control device 12 to control the first spindle drive mechanism 30, the first tool rest drive mechanism 38, the second tool rest drive mechanism 44 and the second spindle drive mechanism 54 in a mutually associated manner, so as to carry out the sequence of machining programs for the bars W, W' on the basis of the plural cam-reference data processed by using different pulse-train generating sources.

One example of a machining sequence carried out through the above-described sequence of machining programs is described below, with reference to FIG. 11. In the machining sequence example of FIG. 11, a cutting tool (a turning tool) 24 carried on the first tool rest 20 performs, as a first machining process, an outer-diametrical turning process to the bar W securely held in the first spindle 16, under the cooperation of the Z1-axis feed motion of the first spindle 16 and the X1-axis feed motion of the first tool rest 20. After the outer-diametrical turning process is finished, the rotation of the first spindle 16 is halted, and the rotary tool 26 carried on the second tool rest 22 performs a lateral-surface drilling process to the bar W securely held in the first spindle 16, under the X2-axis feed motion of the second tool rest 22.

After the lateral-surface drilling process is finished, the first spindle 16 and the second spindle 18 are operated to rotate in high speed in a synchronized manner, and in this state, the second spindle 18 is operated to carry out the Z3-axis feed motion and the chuck provided therein is operated to hold the leading end portion of the bar W. Then, a cutting tool (a turning tool) 24 carried on the first tool rest 20 performs a parting process to the bar W securely held in both the first and second spindles 16, 18, under the X1-axis feed motion of the first tool rest 20, so as to separate the bar into a bar W' as a blank and a bar W being not machined. In this way, the workpiece to be machined is passed or delivered from the first spindle 16 to the second spindle 18. In this respect, after the lateral-surface drilling process is finished, the second tool rest 22 is operated for indexing rotation, so as to position a cutting tool (a drill) 24 used in the next machining process at a working location. Moreover, after the parting process is finished, the first tool rest 20 is shifted back to an initial position, and, after the delivery is finished, the first spindle 16 is also shifted back to an initial position.

Next, the second spindle 18 is transferred to a position oppositely facing to the cutting tool (the drill) 24 carried on the second tool rest 22, under the cooperation of the X3-axis feed motion and the Z3-axis feed motion of the second spindle. In this position, the cutting tool (the drill) 24 carried on the second tool rest 22 performs an end-surface drilling process to the bar W' securely held in the rotating second spindle 18, under the Z2-axis feed motion of the second tool rest 22.

Figure 11:
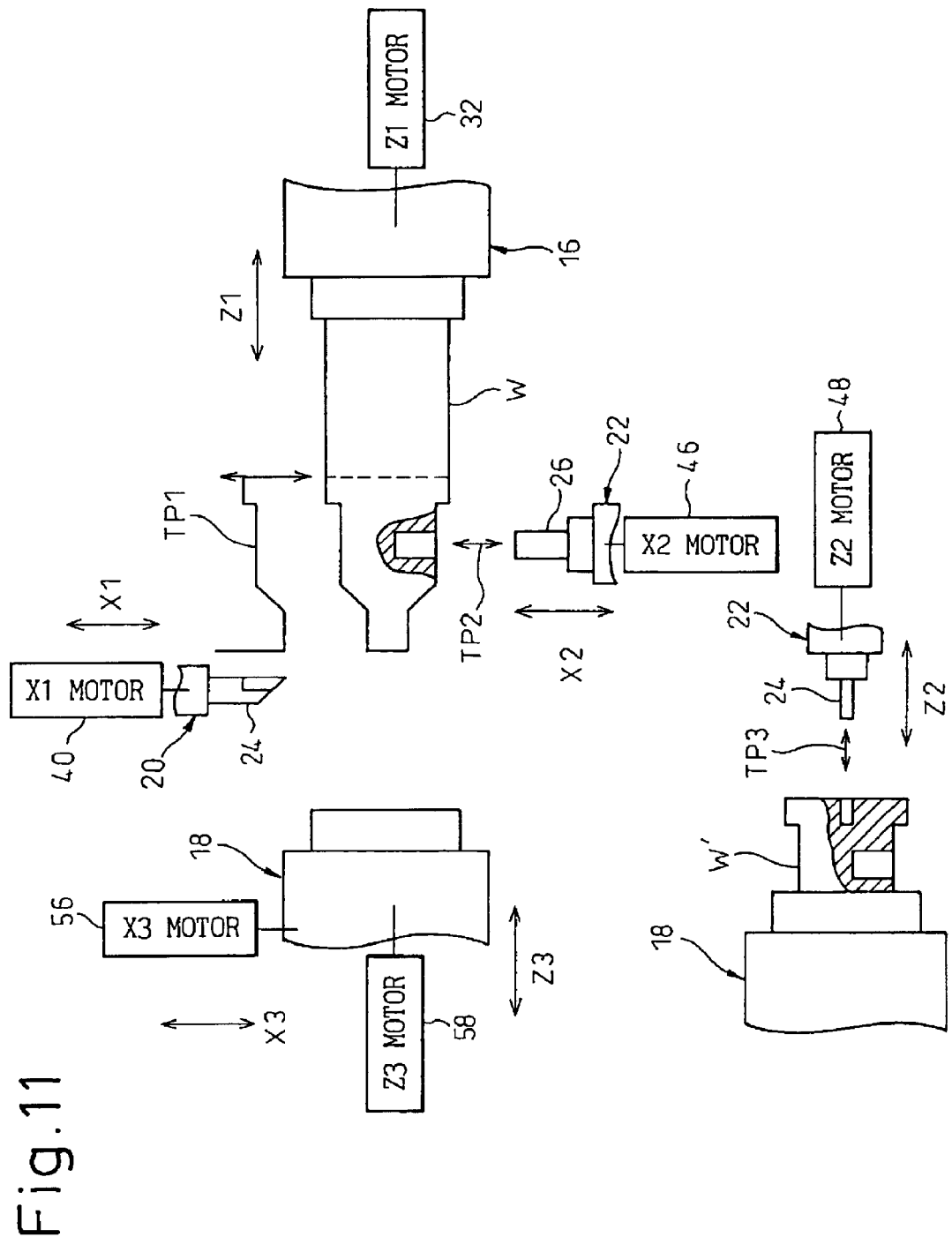
FIG. 11 is a schematic illustration showing an example of a machining sequence performed on the automatically operated lathe of FIG. 7.

FIG. 11 illustrates a tool path of the cutting tool (the turning tool) 24 carried on the first tool rest 20 by an arrow TP1. Also, a tool path of the rotary tool 26 carried on the second tool rest 22 is illustrated by an arrow TP2. Moreover, a tool path of the cutting tool (the drill) 24 carried on the second tool rest 22 is illustrated by an arrow TP3.

A plurality of transfer position data used in the above-described example of machining sequence will be described below with reference to displacement diagrams shown in FIGS. 12 to 15.

Figure 12:
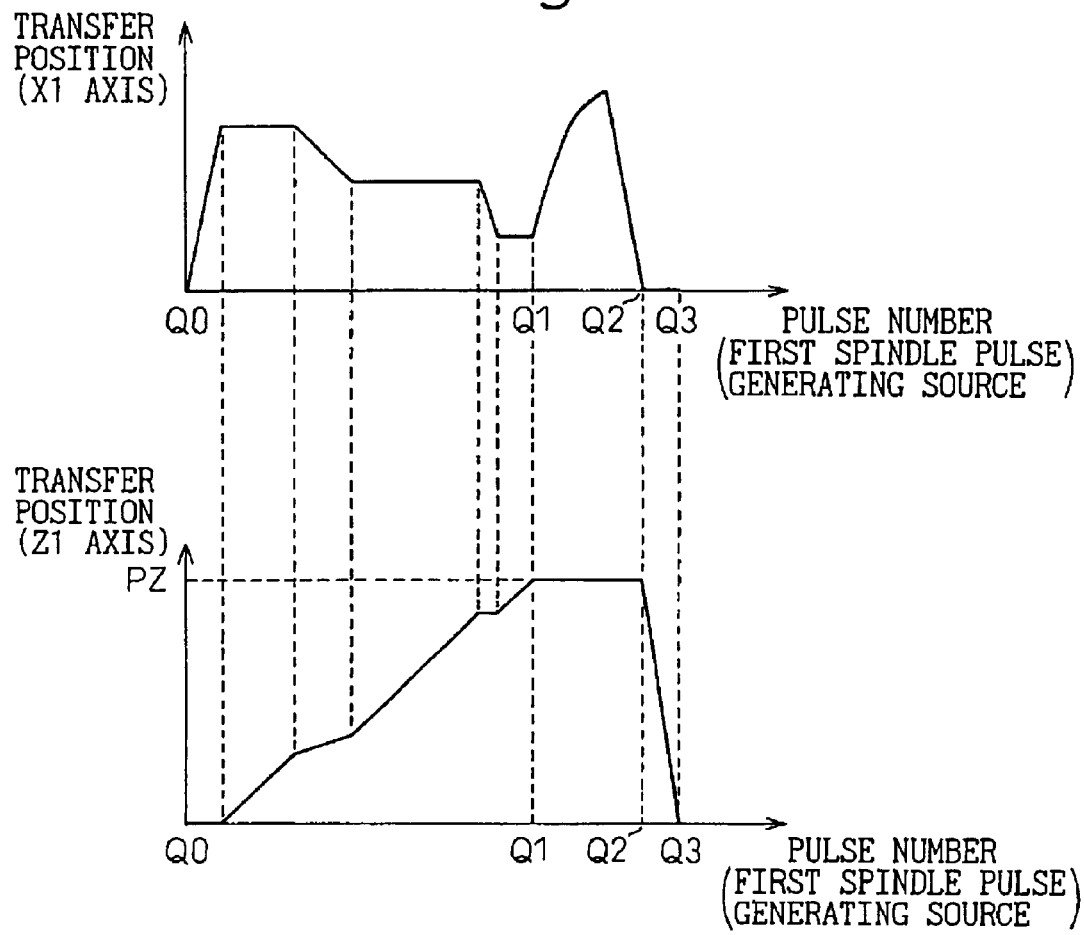
FIG. 12 is a displacement diagram representing cam-reference data for two control axes used in the machining sequence of FIG. 11.

Two displacement diagrams shown in FIG. 12 represent, as different cam diagrams, a cam-reference data for controlling the X1-axis feed motion of the first tool rest 20 and a cam-reference data for controlling the Z1-axis feed motion of the first spindle 16, from a condition where the cutting tool (the turning tool) 24 on the first tool rest 20 performs the outer-diametrical turning process to the bar W securely held in the first spindle 16, to a condition where the tool performs the parting process to the bar W and thereafter is shifted back to the initial position. In these displacement diagrams, the period of the pulse number Q0 to Q3 corresponds to a cam single rotation in a control system for controlling the relative feed motion between the first spindle 16 and the first tool rest 20 and, during this period, the first spindle 16 is in a condition of high-speed rotation. Accordingly, in these displacement diagrams, a spindle-pulse generating source (e.g., the encoder 90 installed within the rotation drive source 34) generating a pulse train corresponding to the rotation of the first spindle 16 is designated as the pulse-train generating source used for processing the cam-reference data.

As seen from two displacement diagrams of FIG. 12, during the period of the pulse number Q0 to Q1, the first spindle 16 and the first tool rest 20 are operated to carry out the feed motions on the respective control axes (Z1-axis and X1-axis) in a synchronized manner on the basis of the cam-reference data. As a result, the cutting tool (the turning tool) 24 is transferred along the tool path TP1 shown in FIG. 11, so as to perform the outer-diametrical turning process to the bar W. Also, during the period of the pulse number Q1 to Q2, the first spindle 16 is kept at a position PZ while the first tool rest 20 is operated to carry out the X1-axis feed motion on the basis of the cam-reference data. As a result, the cutting tool (the turning tool) 24 performs the parting process to the bar W, and thereafter the first tool rest is shifted back to the initial position. Then, during the period of the pulse number Q2 to QE, the first spindle 16 is operated to carry out the Z1-axis feed motion so as to be shifted back to the initial position, on the basis of the cam-reference data.

Figure 13:
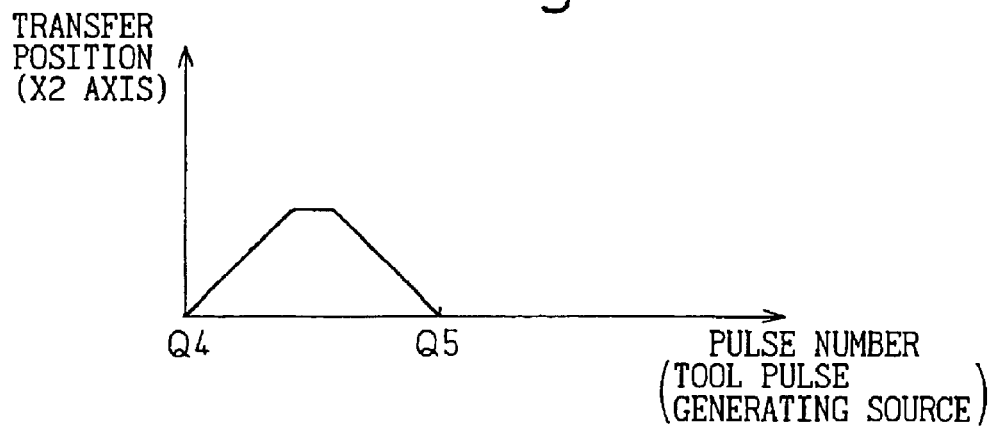
FIG. 13 is a displacement diagram representing cam-reference data for another control axis used in the machining sequence of FIG. 11.

The displacement diagram shown in FIG. 13 represents, as a cam diagram, a cam-reference data for controlling the X2-axis feed motion of the second tool rest 22, during a condition where the rotary tool 26 on the second tool rest 22 performs the lateral-surface drilling process to the bar W securely held in the first spindle 16 as being halted. In this displacement diagram, the period of the pulse number Q4 to Q5 corresponds to a cam single rotation in a control system for controlling the relative feed motion between the first spindle 16 and the second tool rest 22, and, during this period, the rotation of the first spindle 16 is halted. Accordingly, in this displacement diagram, a toll-pulse generating source (e.g., the encoder 92 installed within the rotation drive source 88) generating a pulse train corresponding to the rotation of the rotary tool 26 is designated as the pulse-train generating source used for processing the cam-reference data.

As seen from the displacement diagram of FIG. 13, during the period of the pulse number Q4 to Q5, the second tool rest 22 is operated to carry out the feed motion on the control axis thereof (X2-axis) on the basis of the cam-reference data. As a result, the rotary tool 26 is transferred along the tool path TP2 shown in FIG. 11, so as to perform the lateral-surface drilling process on the bar W.

Two displacement diagrams shown in FIG. 14 represent, as different cam diagrams, a cam-reference data for controlling the Z3-axis feed motion of the second spindle 18 and a cam-reference data for controlling the X3-axis feed motion of the second spindle 18, from a condition where the second spindle 18 receives the bar WI from the first spindle 16 after the lateral-surface drilling process is finished, to a condition where the second spindle is transferred into the position oppositely facing the cutting tool (the drill) 24 on the second tool rest 22. In these displacement diagrams, the period of the pulse number Q6 to Q10 corresponds to a cam single rotation in a control system for controlling the relative feed motion between the first spindle 16 and the second spindle 18, and, during this period, the first spindle 16 is in a condition of high-speed rotation. Accordingly, in these displacement diagrams, a spindle-pulse generating source (e.g., the encoder 90 installed within the rotation drive source 34) generating a pulse train corresponding to the rotation of the first spindle 16 is designated as the pulse-train generating source used for processing the cam-reference data.

As seen from two displacement diagrams of FIG. 14, during the period of the pulse number Q6 to Q7, the second spindle 18 is operated to carry out the feed motion on one control axis (X3-axis), so as to be located at a position axially opposite to the first spindle 16 and to be kept at this position, on the basis of the cam-reference data. Also, during the period of the pulse number Q7 through Q8 to Q9, the second spindle 18 is operated to carry out the feed motion on the other control axis (Z3-axis) in a direction toward the first spindle 16, to securely hold the bar W' by the chuck, and to be kept in this condition, on the basis of the cam-reference data. In this respect, the second spindle 18 is brought into a condition of high-speed rotation with the same speed as the first spindle 16, before the chuck is operated to securely hold the bar We. Then, during the period of the pulse number Q9 to Q10, the second spindle 18 is operated to carry out the feed motion on the X3-axis and the Z3-axis in a synchronized manner, so as to be transferred to the position opposite to the cutting tool (the drill) 24 on the second tool rest 22.

Figure 15:
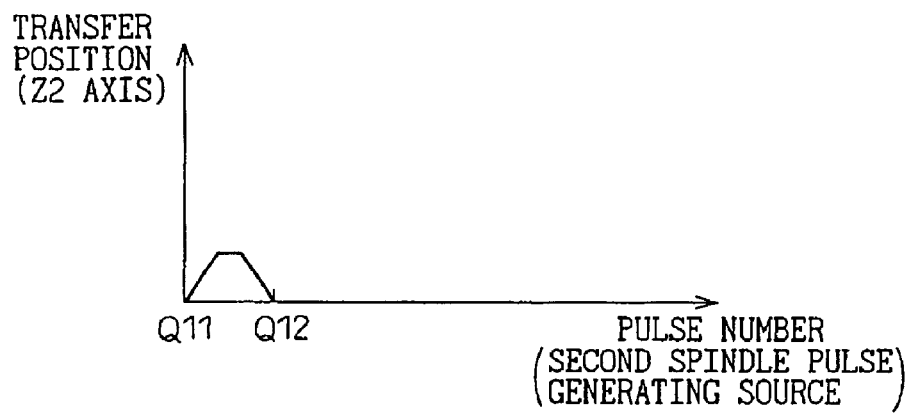
FIG. 15 is a displacement diagram representing cam-reference data for the other one control axes used in the machining sequence of FIG. 11.

The displacement diagram shown in FIG. 15 represents, as a cam diagram, cam-reference data for controlling the Z2-axis feed motion of the second tool rest 22, during a condition where the cutting tool (the drill) 24 on the second tool rest 22 performs the end-surface drilling process to the bar WI securely held in the second spindle 18 rotating in a high-speed. In this displacement diagram, the period of the pulse number Q11 to Q12 corresponds to a cam single rotation in a control system for controlling the relative feed motion between the second spindle 18 and the second tool rest 22, and, during this period, the rotation of the first spindle 16 is halted while the second spindle 18 is in a condition of high-speed rotation. Accordingly, in this displacement diagram, a spindle-pulse generating source (e.g., the encoder 90 installed within the rotation drive source 60) generating a pulse train corresponding to the rotation of the second spindle 18 is designated as the pulse-train generating source used for processing the cam-reference data.

As seen from the displacement diagram of FIG. 15, during the period of the pulse number Q11 to Q12, the second tool rest 22 is operated to carry out the feed motion on the control axis thereof (Z2-axis) on the basis of the cam-reference data. As a result, the cutting tool (the drill) 24 is transferred along the tool path TP3 shown in FIG. 11, so as to perform the end-surface drilling process to the bar W'.

Figure 16:
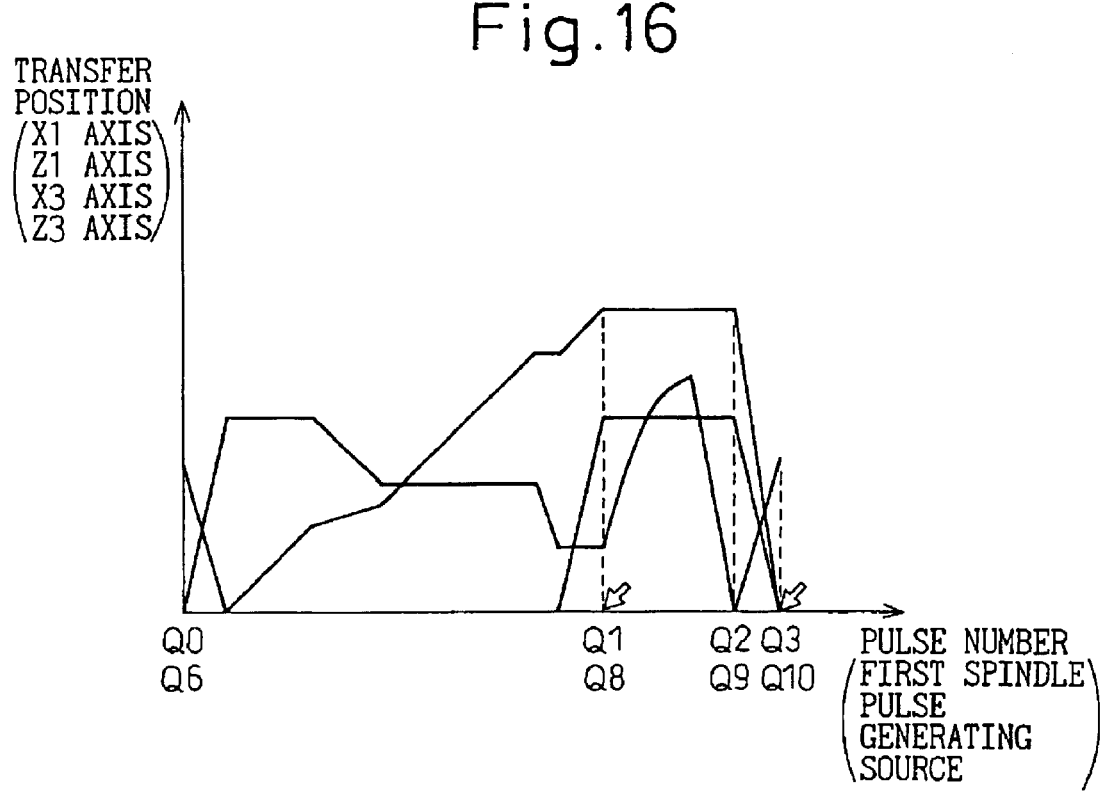
FIG. 16 is a compound-axis displacement diagram composed from the displacement diagrams of FIGS. 12 and 14.

The displacement diagrams (or single-axis diagrams) in relation to the respective control axes used in the above-described machining sequence example can be displayed on the display screen in the display section 64 of the control device 12. In this respect, it is possible to display, as a compound-axis displacement diagram, the plural displacement diagrams associated with a common pulse-train generating source used for processing the cam-reference data, by composing these diagrams on a single screen. More concretely, the two displacement diagrams representing the transfer position data for the first spindle 16 (Z1-axis) and the first tool rest 20 (X1-axis) shown in FIG. 12 as well as the two displacement diagrams representing the transfer position data for the second spindle 18 (Z3-axis, X3-axis) shown in FIG. 14 designate the first spindle-pulse generating source as the pulse-train generating source, so that it is possible to display these displacement diagrams on the screen as a compound-axis displacement diagram, as shown in FIG. 16, by composing these diagrams. It will be appreciated that, in the compound-axis displacement diagram of FIG. 16, the pulse numbers Q0, Q1, Q2 and Q3 in the Z1-axis/X1-axis displacement diagram respectively conform to the pulse numbers Q6, Q8, Q9 and Q10 in the Z3-axis/X3-axis displacement diagram, whereby it is possible to easily comprehend the synchronization between these control axes.

Furthermore, it is possible, on the compound-axis displacement diagram of FIG. 16, to direct the information of an interruption by the two displacement diagrams representing the transfer position data of the second tool rest 22 (X2-axis, Z2-axis) shown in FIGS. 13 and 15. Concerning the interruption information, pulse-train generating sources used for processing the plural transfer position data for interruption may be designated by describing it on the screen or selecting it from a previously provided group as displayed, and a location where these transfer position data interrupts may be designated by a screen picture such as an arrow, or by entering a numerical data, such as a cam rotation angle, the number of pulse or a process number (e.g., a tool number), as already described with reference to FIG. 6A.

As shown in FIG. 16, in the above-described machining sequence example, first, on the screen displaying the compound-axis displacement diagram relating to Z1-axis, X1-axis, Z3-axis and X3-axis in which "a first spindle-pulse generating source" is previously designated as a pulse-train generating source, the interruption by the displacement diagram relating to X2-axis is designated at a location of the pulse number Q1 (Q8), and "a tool-pulse generating source" is designated as a pulse-train generating source for an arithmetic base of this X2-axis displacement diagram. Next, on the same screen, the interruption by the displacement diagram relating to Z2-axis is designated at a location of the pulse number Q3 (Q10), and "a second spindle-pulse generating source" is designated as a pulse-train generating source for an arithmetic base of this Z2-axis displacement diagram.

Figure 17:
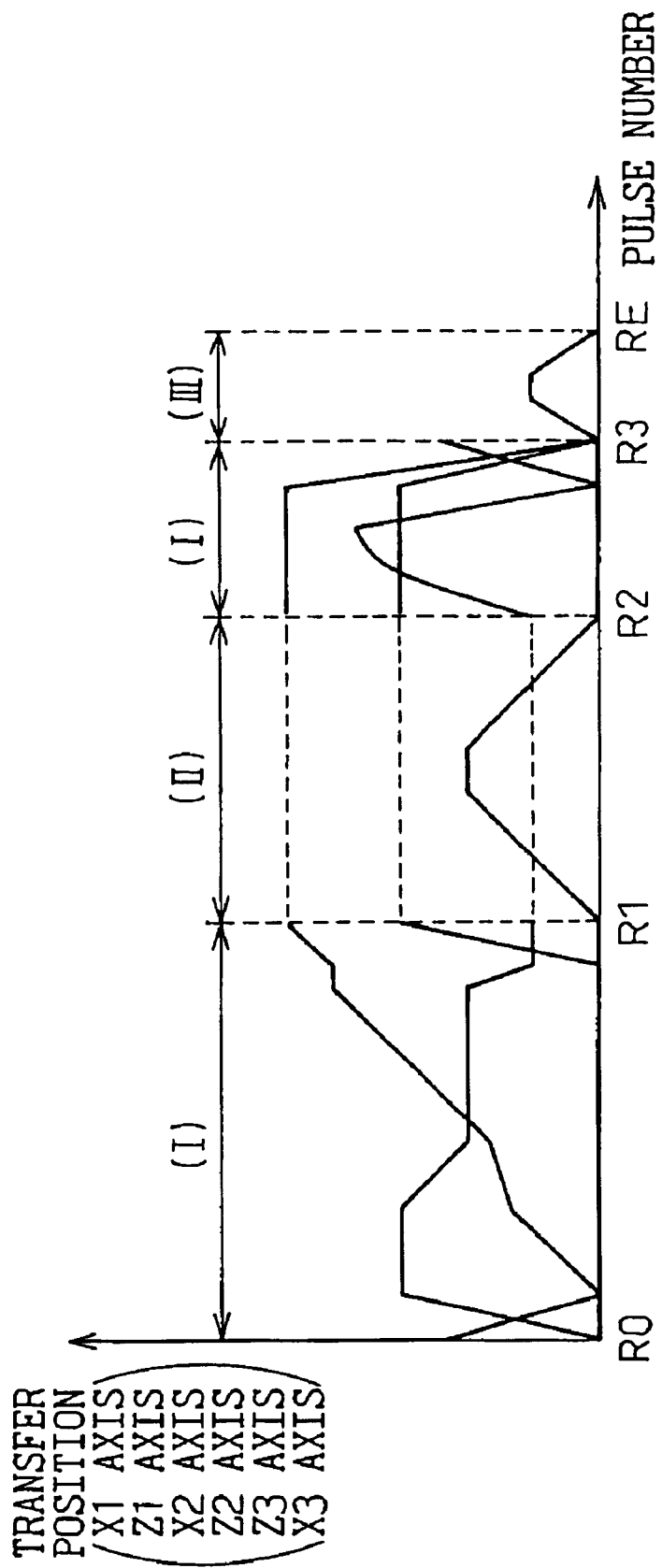
FIG. 17 is a compound-axis displacement diagram representing a state after the compound-axis displacement diagram of FIG. 16 is interrupted by the displacement diagrams of FIGS. 13 and 15.
Figure 18:
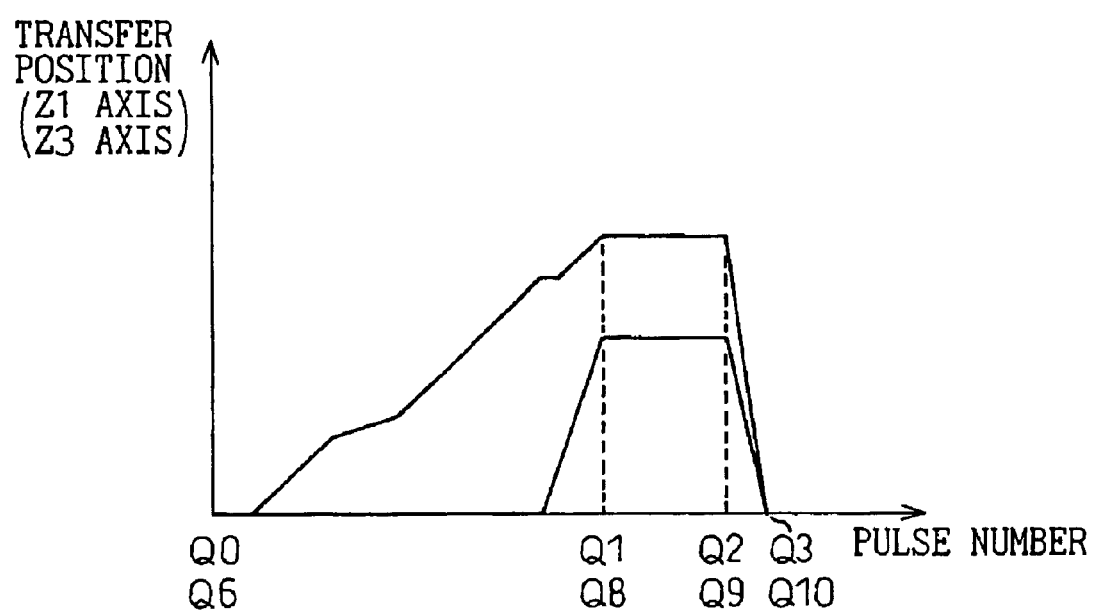
FIG. 18 is a displacement diagram representing a state where the compound-axis displacement diagram of FIG. 16 is incompletely prepared.

FIG. 17 shows a compound-axis displacement diagram relating to all of the control axes in a state after the interruption information is directed. On the basis of this compound-axis displacement diagram, the machining sequence example as shown in FIG. 11 is effectively performed as described below.

First, during the pulse number R0 (corresponding to Q0 and Q6 in FIG. 16) to R1 (corresponding to Q1 and Q8 in FIG. 16), the outer-diametrical turning process to the bar w by the cutting tool (the turning tool) 24 on the first tool rest 20 and the preparation operation of the bar delivery process by the second spindle 18 are performed by using the first spindle-pulse generating source (I). Then, just at the pulse number R1, the feed motions of the first spindle 16 and the first tool rest 20 are halted. During the pulse number R1 (corresponding to Q4 in FIG. 13) to R2 (corresponding to Q5 in FIG. 13), the lateral-surface drilling process on the bar W by the rotary tool 26 on the second tool rest 22 is performed by using the tool-pulse generating source (II).

Successively, during the pulse number R2 (corresponding to Q1 and Q8 in FIG. 16) to R3 (corresponding to Q3 and Q10 in FIG. 16), the parting process of the bar W by the cutting tool (the turning tool) 24 on the first toll rest 20, the bar delivery process from the first spindle 16 to the second spindle 18, and the preparation operation of the end-surface machining by the second spindle 18 are performed by using the first spindle-pulse generating source (I). Finally, during the pulse number R3 (corresponding to Q11 in FIG. 15) to RE (corresponding to Q12 in FIG. 15), the end-surface drilling process to the bar W' by the cutting tool (the drill) 24 on the second tool rest 22 is performed by using the second spindle-pulse generating source (III). In this manner, one machining cycle is completed.

Incidentally, when the bar delivery process is performed in the above-described machining sequence example, it is advantageous that the start time of the Z3-axis feed motion of the second spindle 18 to be shifted toward the first spindle 16 is determined at such a time as to ensure a best efficiency in a correlation with the operation of the first spindle 16, from the viewpoint of reducing a working time required to a single machining cycle. In the conventional NC lathe, this type of timing is generally relatively difficult, and has tended to rely on an operator's experience or skill. Contrary to this, in the automatically operated lathe 10 in which the control device 12 is installed, it is possible to significantly easily perform this type of timing on the displacement diagram.

More concretely, when the compound-axis displacement diagram of FIG. 16 is prepared, it is advisable that the displacement diagram representing the Z1-axis feed motion of the first spindle 16 is combined with the displacement diagram representing the Z3-axis feed motion of the second spindle 18 in such a manner as to accurately place the coordinate of the pulse number Q1 and the coordinate of the pulse number Q8 at the identical pulse number. To this end, the input section 62 of the control device 12 is preferably constituted to permit a relative position between the plural displacement diagrams, for which the common pulse-train generating source is designated, to be adjusted by shifting them relative to each other on the display screen of the display section 64. The positional adjustment of the displacement diagrams may be performed by a screen picture such as an arrow (so-called a drag operation), or by entering a numerical data, such as a cam rotation angle, the number of pulse or a process number (e.g., a tool number), in the same way as the designation of the location to be interrupted, as already described.

According to this arrangement, it is ensured that the start time of the Z3-axis feed motion of the second spindle 18 to be shifted toward the first spindle 16 is automatically determined at a most efficient time so that the first spindle 16 and the second spindle 18 simultaneously reach a bar delivery position. Consequently, the idle time of the feed motion of each spindle 16, 18 is eliminated, and the working time required to the single machining cycle is reduced.

While the present invention has been described with reference to the preferred embodiments thereof, it will be understood that the invention is not restricted to those embodiments and that various changes and modifications may be made without departing from the disclosure of the claims.

What is claimed is:

1. A method for controlling an automatically operated lathe provided with at least one spindle and at least one tool rest, comprising:
   providing each of a plurality of transfer position data required in a sequence of machining programs in connection with said at least one spindle and said at least one tool rest in a form of a cam-reference data directing a transfer position as a function of a cam rotation quantity;
   providing a plurality of pulse-train generating sources, each of which generates any pulse train;
   designating, with regard to each of said plurality of transfer position data, a pulse-train generating source for generating a pulse train defining said cam rotation quantity as one component of said cam-reference data, said pulse-train generating source being selected from said plurality of pulse-train generating sources; and
   processing each of said plurality of transfer position data provided in the form of said cam-reference data by using said pulse train generated through said pulse-train generating source as designated, to control a relative feed motion between said at least one spindle and said at least one tool rest in said sequence of machining programs.

2. A method for controlling, as set forth in claim 1, wherein said at least one spindle and said at least one tool rest are capable of performing a relative feed motion along a plurality of control axes, and wherein the step of designating said pulse-train generating source includes designating said pulse-train generating source with regard to each of said plurality of transfer position data in relation to each of said plurality of control axes.

3. A method for controlling, as set forth in claim 1, further comprising a step of designating a time-series allocation of said plurality of transfer position data in said sequence of machining programs, wherein the step of processing said transfer position data includes processing, in accordance with said time-series allocation as designated, each of said plurality of transfer position data provided in the form of said cam-reference data.

4. A method for controlling, as set forth in claim 1, further comprising a step of showing, in a form of a displacement diagram, each of said plurality of transfer position data provided in the form of said cam-reference data.

5. A method for controlling, as set forth in claim 4, wherein the step of designating said pulse-train generating source includes designating, in association with said displacement diagram, said pulse-train generating source with regard to each of said plurality of transfer position data.

6. A method for controlling, as set forth in claim 4, further comprising a step of designating a time-series allocation of said plurality of transfer position data in said sequence of machining programs on said displacement diagram, wherein the step of processing said transfer position data includes processing, in accordance with said time-series allocation as designated on said displacement diagram, each of said plurality of transfer position data provided in the form of said cam-reference data.

7. A method for controlling, as set forth in claim 6, wherein said at least one spindle and said at least one tool rest are capable of performing a relative feed motion along a plurality of control axes, and wherein the step of designating said time-series allocation includes designating, on said displacement diagram, a synchronization between said plurality of transfer position data for respectively operationally controlling said plurality of control axes.

8. A method for controlling, as set forth in claim 1, wherein said plurality of pulse-train generating sources include a spindle-pulse generating source generating a pulse train corresponding to a rotation of said at least one spindle.

9. A method for controlling, as set forth in claim 1, wherein said plurality of pulse-train generating sources include an outside-pulse generating source generating a pulse train irrespective of an operation of the automatically operated lathe.

10. An automatically operated lathe, comprising:
a lathe bed;
at least one spindle mounted on said lathe bed;
at least one tool rest mounted on said lathe bed;
a control device for controlling an operation of said at least one spindle and said at least one tool rest on said lathe bed; and
a plurality of pulse-train generating sources, each of which generates any pulse train;
said control device including:
an input section permitting an entering of each of a plurality of transfer position data required in a sequence of machining programs in connection with said at least one spindle and said at least one tool rest in a form of a cam-reference data directing a transfer position as a function of a cam rotation quantity, and permitting a designation of a pulse-train generating source for generating a pulse train defining said cam rotation quantity as one component of said cam-reference data, with regard to each of said plurality of transfer position data, said pulse-train generating source being selected from said plurality of pulse-train generating sources; and
a processing section processing each of said plurality of transfer position data entered through said input section in the form of said cam-reference data by using said pulse train generated through said pulse-train generating source designated through said input section, to thereby generate a control signal for controlling a relative feed motion between said at least one spindle and said at least one tool rest in said sequence of machining programs.

11. An automatically operated lathe, as set forth in claim 10, wherein said at least one spindle and said at least one tool rest are capable of performing a relative feed motion along a plurality of control axes on said lathe bed, and wherein said input section of said control device permits a designation of said pulse-train generating source with regard to each of said plurality of transfer position data in relation to each of said plurality of control axes.

12. An automatically operated lathe, as set forth in claim 10, wherein said input section of said control device permits an designation of a time-series allocation of said plurality of transfer position data in said sequence of machining programs, and wherein said processing section of said control device processes, in accordance with said time-series allocation designated through said input section, each of said plurality of transfer position data entered in the form of said cam-reference data through said input section.

13. An automatically operated lathe, as set forth in claim 10, wherein said control device further includes a display section displaying, in a form of a displacement diagram, each of said plurality of transfer position data entered through said input section in the form of said cam-reference data.

14. An automatically operated lathe, as set forth in claim 13, wherein said input section of said control device permits a designation of said pulse-train generating source with regard to each of said plurality of transfer position data, in association with said displacement diagram displayed in said display section.

15. An automatically operated lathe, as set forth in claim 13, wherein said input section of said control device permits a designation of a time-series allocation of said plurality of transfer position data in said sequence of machining programs on said displacement diagram displayed in said display section, and wherein said processing section of said control device processes, in accordance with said time-series allocation as designated on said displacement diagram, each of said plurality of transfer position data entered in the form of said cam-reference data through said input section.

16. An automatically operated lathe, as set forth in claim 15, wherein said at least one spindle and said at least one tool rest are capable of performing a relative feed motion along a plurality of control axes on said lathe bed, and wherein said input section of said control device permits a designation of a synchronization between said plurality of transfer position data for respectively operationally controlling said plurality of control axes, on said displacement diagram displayed in said display section.

17. An automatically operated lathe, as set forth in claim 10, wherein said plurality of pulse-train generating sources include a spindle-pulse generating source generating a pulse train corresponding to a rotation of said at least one spindle.

18. An automatically operated lathe, as set forth in claim 10, wherein said plurality of pulse-train generating sources include an outside-pulse generating source generating a pulse train irrespective of an operation of the automatically operated lathe.

19. A control device for use in an automatically operated lathe provided with at least one spindle and at least one tool rest, comprising:
an input section permitting an entering of each of a plurality of transfer position data required in a sequence of machining programs in connection with said at least one spindle and said at least one tool rest in a form of a cam-reference data directing a transfer position as a function of a cam rotation quantity, and permitting a designation of a pulse-train generating source for generating a pulse train defining said cam rotation quantity as one component of said cam-reference data, with regard to each of said plurality of transfer position data, said pulse-train generating source being selected from a plurality of pulse-train generating sources as previously provided; and
a processing section processing each of said plurality of transfer position data entered through said input section in the form of said cam-reference data by using said pulse train generated through said pulse-train generating source designated through said input section, to thereby generate a control signal for controlling a relative feed motion between said at least one spindle and said at least one tool rest in said sequence of machining programs.

20. A control device, as set forth in claim 19, wherein said input section permits an designation of a time-series allocation of said plurality of transfer position data in said sequence of machining programs, and wherein said processing section processes, in accordance with said time-series allocation designated through said input section, each of said plurality of transfer position data entered in the form of said cam-reference data through said input section.

21. A control device, as set forth in claim 19, further comprising a display section displaying, in a form of a displacement diagram, each of said plurality of transfer position data entered through said input section in the form of said cam-reference data.

22. A control device, as set forth in claim 21, wherein said input section permits a designation of said pulse-train generating source with regard to each of said plurality of transfer position data, in association with said displacement diagram displayed in said display section.

23. A control device, as set forth in claim 21, wherein said input section permits a designation of a time-series allocation of said plurality of transfer position data in said sequence of machining programs on said displacement diagram displayed in said display section, and wherein said processing section processes, in accordance with said time-series allocation as designated on said displacement diagram, each of said plurality of transfer position data entered in the form of said cam-reference data through said input section.

* * * * *